US012483900B2

(12) United States Patent
Furuichi

(10) Patent No.: US 12,483,900 B2
(45) Date of Patent: Nov. 25, 2025

(54) COMMUNICATION CONTROL DEVICE, COMMUNICATION DEVICE, AND COMMUNICATION CONTROL METHOD

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 472 days.

(21) Appl. No.: 17/776,062

(22) PCT Filed: Oct. 26, 2020

(86) PCT No.: PCT/JP2020/040140
§ 371 (c)(1),
(2) Date: May 11, 2022

(87) PCT Pub. No.: WO2021/100411
PCT Pub. Date: May 27, 2021

(65) Prior Publication Data
US 2022/0400386 A1   Dec. 15, 2022

(30) Foreign Application Priority Data
Nov. 19, 2019 (JP) ................................. 2019-208938

(51) Int. Cl.
H04W 16/14 (2009.01)
H04L 5/14 (2006.01)
H04W 56/00 (2009.01)

(52) U.S. Cl.
CPC ........... *H04W 16/14* (2013.01); *H04L 5/1469* (2013.01); *H04W 56/001* (2013.01)

(58) Field of Classification Search
CPC .... H04W 16/14; H04W 56/001; H04L 5/1469
See application file for complete search history.

(56) References Cited

U.S. PATENT DOCUMENTS

2018/0367289 A1* 12/2018 Kim ..................... H04L 5/0078
2019/0044614 A1*  2/2019 Khoshnevisan ...... H04L 5/1469

FOREIGN PATENT DOCUMENTS

EP        3038399 A1     6/2016
JP     2009-514412 A    4/2009
(Continued)

OTHER PUBLICATIONS

"National synchronization regulatory framework options in 3400-3800 MHz: a toolbox for coexistence of MFCNs in synchronised, unsynchronised and semi-synchronised operation in 3400-3800 MHZ", from CEPT ECC, ECC Report 296, Mar. 8, 2019, pp. 1-137. (Year: 2019).*

(Continued)

*Primary Examiner* — Robert C Scheibel
(74) *Attorney, Agent, or Firm* — CHIP LAW GROUP

(57) ABSTRACT

A communication control device according to one aspect of the present disclosure includes an acquisition unit, a determination unit, and a decision unit. The acquisition unit acquires a synchronization mode of a time division duplex related to a first wireless system. The determination unit determines whether or not interference occurs in a case where the first wireless system and a second wireless system perform wireless communication by the time division duplex in a shared frequency band The decision unit decides a synchronization mode to be used in the first wireless system on the basis of a result of the determination and a synchronization mode related to the first wireless system.

20 Claims, 16 Drawing Sheets

(56) References Cited

FOREIGN PATENT DOCUMENTS

| WO | 2007/050958 A1 | 5/2007 |
|---|---|---|
| WO | 2015/025344 A1 | 2/2015 |
| WO | 2019/187507 A1 | 10/2019 |

OTHER PUBLICATIONS

"On IAB class", Ericsson, 3GPP TSG-RAN4, 93 Meeting, Reno, USA, R4-1914218, Nov. 18-2, 2019, 8 pages.

"National synchronisation regulatory framework options in 3400-3800 MHz: a toolbox for coexistence of MFCNs in synchronised, unsynchronised and semi-synchronised operation in 3400-3800 MHz", ECC Report 296, Excise Control Code, Mar. 8, 2019, 138 pages.

"CBRS Coexistence Technical Specification", CBRSA-TS-2001, Version 1.0.0, URL: https://ongoalliance.org/wp-content/uploads/2018/06/CBRSA-TS-2001-V1.0.0.pdf, Feb. 1, 2018, 20 pages.

"Requirements for Commercial Operation in the U.S. 3550-3700 MHZ Citizens Broadband Radio Service Band", Wireless Innovation Forum, WINNF-TS-0112, Version V1.9.1, Spectrum Sharing Committee WG1, Mar. 11, 2020, 81 pages.

"Technical and operational requirements for the operation of white space devices under geo-location approach", ECC Report 186, Electronic Communications Committee, URL: https://docdb.cept.org/download/124023a2-73ee/ECCREP186.PDF, Jan. 2013, 181 pages.

"The Wireless Telegraphy (White Space Devices) (Exemption) Regulations 2015", Electronic Communications, Statutory Instruments, No. 2066, Dec. 2015, 09 pages.

"Signaling Protocols and Procedures for Citizens Broadband Radio Service (CBRS): WInnForum Recognized CBRS Grouping Information", Wireless Innovation Forum, WINNF-SSC-0010, Version 4.2.0, Spectrum Sharing Committee, Jun. 30, 2021, 11 pages.

"Part 96—Citizens Broadband Radio Service", Code of Federal Regulation, URL: https://www.ecfr.gov/current/title-47/chapter-I/subchapter-D/part-96, Jun. 23, 2015, 17 pages.

"3rd Generation Partnership Project; Technical Specification Group Radio Access Network; Evolved Universal Terrestrial Radio Access (E-UTRA); Base Station (BS) radio transmission and reception (Release 8)", Technical Specification, 3GPP TS 36.104, V8.0.0, Dec. 2007, 47 pages.

"3rd Generation Partnership Project; Technical Specification Group Radio Access Network; NR; Base Station (BS) radio transmission and reception (Release 15)", Technical Specification, 3GPP TS 38.104, V15.0.0, Dec. 2017, 121 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Technical Specification, 3GPP TS 36.300, V8.0.0, Mar. 2007, 82 pages.

"3rd Generation Partnership Project; Technical Specification Group Radio Access Network; NR; Physical channels and modulation (Release 15)", Technical Specification, 3GPP TS 38.211, V15.0.0, Dec. 2017, 73 pages.

"3rd Generation Partnership Project; Technical Specification Group Radio Access Network; NR; Physical layer procedures for control (Release 15)", Technical Specification, 3GPP TS 38.213, V15.0.0, Dec. 2017, 56 pages.

"White Space Devices (WSD); Wireless Access Systems operating in the 470 MHz to 790 MHz TV broadcast band; Harmonized EN covering the essential requirements of article 3.2 of the R&TTE Directive", Harmonized European Standard, ETSI EN 301 598, V1.1.1, Apr. 2014, 72 pages.

International Search Report and Written Opinion of PCT Application No. PCT/JP2020/040140, issued on Jan. 19, 2021, 13 pages of ISRWO.

* cited by examiner

180# COMMUNICATION CONTROL DEVICE, COMMUNICATION DEVICE, AND COMMUNICATION CONTROL METHOD

CROSS REFERENCE TO RELATED APPLICATIONS

This application is a U.S. National Phase of International Patent Application No. PCT/JP2020/040140 filed on Oct. 26, 2020, which claims priority benefit of Japanese Patent Application No. JP 2019-208938 filed in the Japan Patent Office on Nov. 19, 2019. Each of the above-referenced applications is hereby incorporated herein by reference in its entirety.

TECHNICAL FIELD

The present disclosure relates to a communication control device, a communication device, and a communication control method.

BACKGROUND ART

Hitherto, due to increase in a wireless environment in which various wireless systems are mixed and an enrichment of content provided wirelessly, a problem of exhaustion of radio resources (for example, spectrum) that can be allocated to the wireless systems has emerged. Accordingly, as a means for extracting necessary radio resources, "dynamic spectrum sharing (dynamic spectrum access (DSA))" using temporal and spatial vacancies (white spaces) in a frequency band allocated to a specific wireless system has rapidly attracted attention.

CITATION LIST

Non-Patent Document

Non-Patent Document 1: CEPT ECC (Common Effective Preferential Tariff Electronic Communications Committee), "ECC Report 296 National synchronisation regulatory framework options in 3400-3800 MHZ: a toolbox for coexistence of MFCNs in synchronised, unsynchronised and semi-synchronised operation in 3400-3800 MHZ", 8 Mar. 2019
Non-Patent Document 2: CBRS Alliance "CBRSA-TS-2001" Feb. 1, 2018
Non-Patent Document 3: WINNF (Wireless Innovation Forum), "WINNF-TS-0112"
Non-Patent Document 4: CEPT ECC, "ECC Report 186 Technical and operational requirements for the operation of white space devices under geo-location approach", January 2013
Non-Patent Document 5: The National Archives, "The Wireless Telegraphy (White Space Devices) (Exemption) Regulations 2015"
Non-Patent Document 6: WINNF, "WINNF-SSC-0010"
Non-Patent Document 7: FCC (Federal Communications Commissions), "C.F.R (Code of Federal Regulations) Part 96"
Non-Patent Document 8: 3GPP (3rd Generation Partnership Project), "TS (Technical Specification) 36.104"
Non-Patent Document 9: 3GPP, "TS38.104",
Non-Patent Document 10: 3GPP, "TS36.300"
Non-Patent Document 11: 3GPP, "TS38.211"
Non-Patent Document 12: 3GPP, "TS 38.213"
Non-Patent Document 13: ETSI (European Telecommunications Standards Institute), "EN 301 598"

SUMMARY OF THE INVENTION

Problems to be Solved by the Invention

Non-Patent Document 1 discloses an option of a regulatory framework regarding coexistence of different operators between 5G New Radio (NR) networks. For example, regarding operation of time synchronization between coexisting operators in a case where a time division duplex (TDD) is performed, Non-Patent Document 1 discloses three major classifications of synchronized operation, unsynchronized operation, and semi-synchronized operation.

The synchronized operation is described such that all communication devices belonging to a network simultaneously perform uplink (UL) communication or simultaneously perform downlink (DL) communication so that communication in different communication directions (Link directions) does not simultaneously occur between networks. The synchronized operation has an advantage that what is called cross link interference (CLI) does not occur. Furthermore, there is an advantage that it is not necessary to perform preliminary consultation (offline cooperation) on a communication direction between coexisting operators. On the other hand, there are disadvantages that coexisting operators need to constantly perform quality monitoring to maintain synchronization accuracy, and that TDD frame structures cannot be tuned according to a business model. The TDD frame structure indicates a communication direction in a unit period called a slot or the like existing in one frame period. For example, each operator cannot arbitrarily perform operations such as employing a TDD frame structure in which a ratio of slots of the UL communication is large for the Internet of Things (IoT) and employing a TDD frame structure in which a ratio of slots of the DL communication is large for the enhanced mobile broadband (eMBB).

The unsynchronized operation is described such that, in contrast to the synchronized operation, neither adjustment of the TDD frame structure nor time synchronization is performed between operators. In the unsynchronized operation, tuning of the TDD frame structure according to the business model is possible, and flexible network design is possible. On the other hand, in the unsynchronized operation, disadvantages such as an increase in adjacent channel interference and an increase in CLI may occur.

The semi-synchronized operation is described such that a part of a frame is operated in synchronization. FIG. 1 is a diagram illustrating the semi-synchronized operation. FIG. 1 illustrates a TDD frame structure used by an operator A and a TDD frame structure used by an operator B. It is determined that the DL communication is performed in a slot designated as Fixed DL, and it is determined that the UL communication is performed in a slot designated as Fixed UL. The other frames can be arbitrarily decided by the operator. In FIG. 1, the operator A divides the remaining three slots into one slot for performing the DL communication and two slots for performing the UL communication. On the other hand, unlike operator A, operator B sets all the remaining three slots as slots for performing the DL communication. As described above, flexibility of operation remains in the semi-synchronized operation. The semi-synchronized operation can be regarded as an intermediate existence between the synchronized operation and the unsynchronized operation.

Non-Patent Document 1 assumes sharing in what is called a licensed band such as 3400 to 3800 MHz. That is, Non-Patent Document 1 assumes that coexisting operators are network operators and the number of coexisting operators is also small. Under this assumption, it is considered that it is possible to finally form an agreement between operators such as offline cooperation.

However, in a case where not only traditional network operators but also non-network operators coexist like a private network, it is very difficult to form the agreement. For example, in a citizens broadband radio service (CBRS) in the United States, a license such as a priority access license (PAL) is granted to a non-network operator through an auction. Moreover, since the CBRS recognizes the rental business of PALs (what is called a secondary market), it is expected that the consensus building will be further difficult. Therefore, it is desirable that coexistence of operators in a network requiring a PAL (PAL Network) or the like is managed and controlled by an entity such as a spectrum access system (SAS) or a coexistence manager (CxM) disclosed in Non-Patent Document 2 in order to consider TDD setting (TDD configuration).

Accordingly, the present disclosure provides a communication control device and the like that enable wireless systems performing wireless communication by a time division duplex in a shared frequency band to coexist.

Solutions to Problems

A communication control device according to one aspect of the present disclosure includes an acquisition unit, a determination unit, and a decision unit. The acquisition unit acquires a synchronization mode of a time division duplex related to a first wireless system. The determination unit determines whether or not interference occurs in a case where the first wireless system and a second wireless system perform wireless communication by the time division duplex in a shared frequency band The decision unit decides a synchronization mode to be used in the first wireless system on the basis of a result of the determination and a synchronization mode related to the first wireless system.

The communication control device may be configured such that the decision unit decides a frame structure of the time division duplex to be used in the first wireless system on the basis of the synchronization mode decided.

The communication control device may be configured such that in a case where it is determined that the interference occurs, the decision unit sets the synchronization mode to be used in the first wireless system to be same as a synchronization mode to be used in the second wireless system.

The communication control device may be configured such that in a case where the synchronization mode to be used in the first wireless system is same as the synchronization mode to be used in the second wireless system the decision unit sets a frame structure to be used in the first wireless system to be same as a frame structure to be used in the second wireless system.

The communication control device may be configured such that the acquisition unit acquires a frame structure related to the first wireless system, and in a case where the synchronization mode to be used in the first wireless system is the same as the synchronization mode to be used in the second wireless system, when the frame structure to be used in the second wireless system is not included in the frame structure related to the first wireless system, the decision unit decides the frame structure to be used in the first wireless system from among frame structures related to the first wireless system.

The communication control device may be configured such that the decision unit confirms whether a communication direction in a unit period indicated by the frame structure to be used in the second wireless system matches with a communication direction in a unit period indicated by the frame structure related to the first wireless system and corresponding to the unit period, and decides the frame structure to be used in the first wireless system from among frame structures related to the first wireless system on the basis of a matched number.

The communication control device may be configured such that the acquisition unit acquires a synchronization mode related to the second wireless system, and in a case where the synchronization mode to be used in the second wireless system is not included in the synchronization mode related to the first wireless system, when the synchronization mode related to the first wireless system is included in the synchronization mode related to the second wireless system, the decision unit decides the synchronization mode to be used in the second wireless system from synchronization modes related to the second wireless system.

The communication control device may be configured such that in a case where it is determined that the interference does not occur, the decision unit decides a synchronization mode having a highest priority among synchronization modes related to the first wireless system as the synchronization mode to be used in the first wireless system.

The communication control device may be configured such that
the acquisition unit acquires a frame structure related to the first wireless system, and
in a case where it is determined that the interference does not occur, the decision unit decides a frame structure having a highest priority among frame structures related to the first wireless system as a frame structure to be used in the first wireless system.

The communication control device may be configured such that in a case where it is determined that the interference does not occur, the decision unit decides a frame structure having a highest priority among frame structures related to the first wireless system as a frame structure to be used in the first wireless system.

The communication control device may be configured such that the determination unit sets, as the second wireless system, a wireless communication system in which a distance from the first wireless system is within a predetermined value and wireless communication by the time division duplex is performed in the shared frequency band.

The communication control device may be configured such that the determination unit performs the determination at least on the basis of a separation between a spectrum allocated to the first wireless system and a spectrum allocated to the second wireless system.

The communication control device may be configured such that the determination unit makes the determination at least on the basis of an overlap between a communication region provided by the first wireless system and a communication region provided by the second wireless system.

The communication control device may be configured such that the determination unit performs the determination by changing a value of a parameter used by the first wireless system to perform wireless communication by the time division duplex in the shared frequency band.

The communication control device may be further include a transmission unit that transmits the synchronization mode to be used in the first wireless system to the first wireless system.

In another aspect of the present disclosure, there is provided a communication device including:
- a transmission unit that transmits a synchronization mode of a time division duplex to a communication control device;
- an acquisition unit that receives a synchronization mode or a frame structure of the time division duplex decided by the communication control device; and
- a provision unit that provides a wireless communication service of the time division duplex in a shared frequency band to a predetermined terminal on the basis of a received frame structure, in which
- the synchronization mode or the frame structure decided by the communication control device is decided on the basis of a transmitted synchronization mode, a synchronization mode of another communication device using the shared frequency band, and a frame structure to be used by or related to the another communication device.

The communication device may be configured such that the acquisition unit receives a condition when providing the wireless communication service from the communication control device, and the provision unit changes a communication parameter when providing the wireless communication service to satisfy the condition.

In another aspect of the present disclosure, there is provided a communication control method including:
- a step of acquiring a synchronization mode of a time division duplex related to a first wireless system;
- a step of determining whether or not interference occurs in a case where the first wireless system and a second wireless system perform wireless communication by the time division duplex in a shared frequency band; and
- a step of deciding a synchronization mode to be used in the first wireless system on the basis of a result of the determination and a synchronization mode related to the first wireless system.

MODE FOR CARRYING OUT THE INVENTION

<<1. Assumed Representative Scenario>>
<1.1 System Model>

Figure 1:
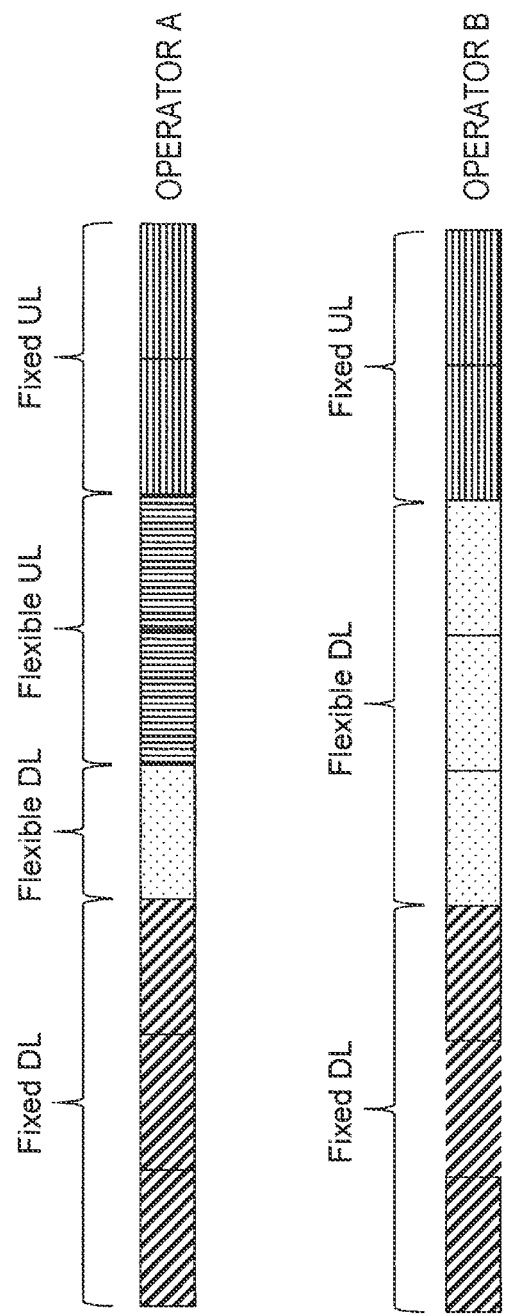
FIG. 1 is a diagram describing semi-synchronized operation.
Figure 2:
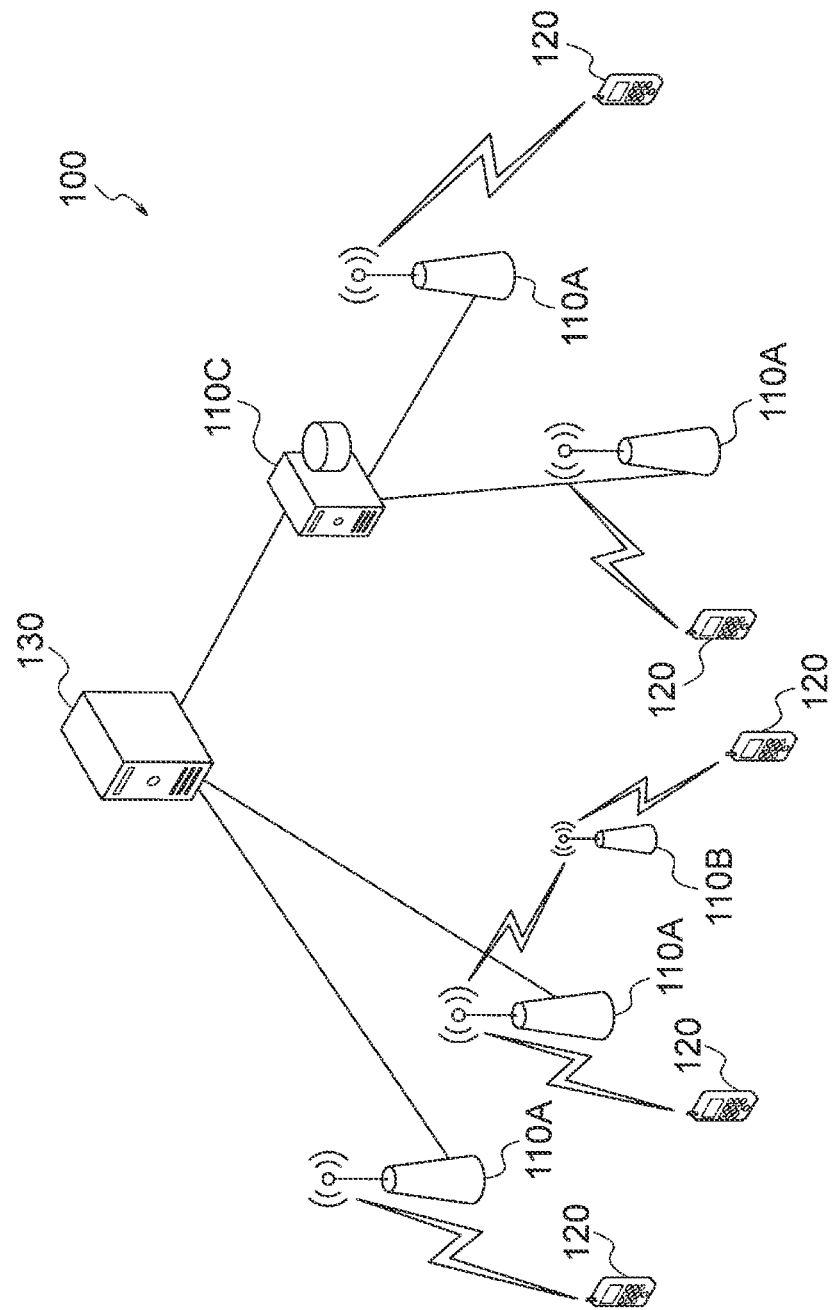
FIG. 2 is a diagram illustrating a system model in an embodiment of the present invention.

FIG. 2 illustrates a system model in an embodiment of the present invention. As illustrated in FIG. 2, this system model is represented by a communication network 100 including wireless communication, and typically includes the following entities.
- Communication device 110
- Terminal 120
- Communication control device 130

Furthermore, this system model includes at least a primary system and a secondary system using the communication network 100. The primary system and the secondary system are configured by the communication device 110 or the communication device 110 and the terminal 120. Although various communication systems can be treated as the primary system or the secondary system, in the present embodiment, the primary system is a wireless system that uses a specific frequency band, and the secondary system is a wireless system that shares a part or all of the frequency bands allocated to the primary system. That is, this system model will be described as a model of a wireless communication system related to dynamic spectrum sharing (dynamic spectrum access (DSA)). Note that this system model is not limited to systems related to dynamic spectrum sharing.

Typically, the communication device 110 is a wireless device that provides a wireless communication service to the terminal 120, such as a wireless base station (Base Station, Node B, eNB, gNB, or the like) or a wireless access point. That is, the communication device 110 provides a wireless communication service to enable wireless communication of the terminal 120. Furthermore, the communication device 1 may be a wireless relay device or an optical extension device called a remote radio head (RRH). In the following description, unless otherwise noted, the communication device 110 will be described as an entity constituting the secondary system.

The coverage (communication region) provided by the communication device 110 is allowed to have various sizes from a large size such as a macro cell to a small size such as a pico cell. Like a distributed antenna system (DAS), a plurality of communication devices 110 may form one cell. Furthermore, in a case where the communication device 110 has a capability of beamforming, a cell or a service area may be formed for each beam.

In the present disclosure, it is assumed that there are two different types of communication devices 110.

In the present disclosure, the communication device 110 that can access the communication control device 130 without using a wireless path that requires permission of the communication control device 130 is referred to as a "communication device 110A". Specifically, for example, the communication device 110 capable of wirelessly connecting to the Internet can be regarded as the "communication device 110A". Furthermore, for example, even in a wireless relay device that does not have a wired Internet connection function, if a wireless backhaul link using a spectrum that does not require permission of the communication control device 130 is constructed with another communication device 110A, such a wireless relay device may also be regarded as the "communication device 110A".

In the present disclosure, the communication device 110 that cannot access the communication control device 130 without a wireless path that requires permission of the communication control device 130 is referred to as a "communication device 110B". For example, a wireless relay device that needs to construct a backhaul link using a spectrum that requires permission of the communication control device 130 can be regarded as a "communication device 110B". Furthermore, for example, a device such as a smartphone having a wireless network provision function represented by tethering and using a spectrum that requires permission of the communication control device 130 in both the backhaul link and the access link may be handled as the "communication device 110B".

The communication device 110 is not necessarily fixedly installed. For example, the communication device 110 may be installed in a mobile object such as an automobile. Furthermore, the communication device 110 does not necessarily need to exist on the ground. For example, the communication device 110 may be included in an object existing in the air or space, such as an aircraft, a drone, a helicopter, or a satellite. Furthermore, for example, the communication device 110 may be included in an object existing on the sea or under the sea, such as a ship or a submarine. Typically, such a mobile communication device 110 corresponds to the communication device 110B, and performs wireless communication with the communication device 110A to secure an access path to the communication control device 130. As a matter of course, even the mobile communication device 110 can be handled as the communication device 110A as long as the spectrum used in the wireless communication with the communication device 110A is not managed by the communication control device 130.

In the present disclosure, unless otherwise specified, the description "communication device 110" includes both meanings of the communication device 110A and the communication device 110B, and may be replaced with either one.

The communication device 110 can be used, operated, or managed by various operators. For example, a mobile network operator (MNO), a mobile virtual network operator (MVNO), a mobile network enabler (MNE), a mobile virtual network enabler (MVNE), a shared facility operator, a neutral host network (NHN) operator, a broadcaster, an enterprise, an educational institution (educational institutions, respective boards of education of local governments, or the like), a real estate (building, apartment, or the like) administrator, an individual, and the like can be assumed as operators related to the communication device 110. Note that the company related to the communication device 110 is not particularly limited. Further, the communication device 110A may be a shared facility used by a plurality of carriers. Furthermore, different companies may perform installation, use, and management of the facilities.

The communication device 110 operated by the company is typically connected to the Internet via a core network. Furthermore, operation, management, and maintenance are performed by a function called Operation, Administration & Maintenance (OA&M). Furthermore, for example, as illustrated in FIG. 2, there may be an intermediate device (network manager) 110C that integrally controls the communication device 110 in the network. The intermediate device 110C is also a type of the communication device 110.

The terminal 120 (User Equipment, User Terminal, User Station, Mobile Terminal, Mobile Station, or the like) is a device that performs wireless communication by a wireless communication service provided by the communication device 110. Typically, a communication device such as a smartphone corresponds to the terminal 120. Note that a device having a wireless communication function can correspond to the terminal 120. For example, a device such as a business camera having a wireless communication function can also correspond to the terminal 120 even if the wireless communication is not a main application. Furthermore, a communication device that transmits data to the terminal 120, such as a wireless station for broadcasting business (field pickup unit (FPU)) that transmits an image for television broadcasting or the like from an outside (site) of a broadcast station to the broadcast station in order to broadcast sports or the like, also corresponds to the terminal 120. Furthermore, the terminal 120 is not necessarily used by a person. For example, like what is called machine type communication (MTC), a device such as a factory machine or a sensor installed in a building may be network-connected to operate as the terminal 120. Furthermore, a device called customer premises equipment (CPE) provided to ensure connection to the Internet may behave as the terminal 120.

Furthermore, as represented by device-to-device (D2D) and vehicle-to-everything (V2X), the terminal 120 may include a relay communication function.

Furthermore, similarly to the communication device 110, the terminal 120 does not need to be fixedly installed or exist on the ground. For example, an object existing in the air or space, such as an aircraft, a drone, a helicopter, a satellite, or the like, may operate as the terminal 120. Furthermore, for example, an object existing on the sea or under the sea, such as a ship or a submarine, may operate as the terminal 120.

In the present disclosure, unless otherwise noted, the terminal 120 corresponds to an entity that terminates a wireless link using a spectrum that requires permission of the communication control device 130. However, depending on a function included in the terminal 120 or an applied network topology, the terminal 120 can perform an operation equivalent to that of the communication device 110. In other words, depending on the network topology, there may be cases where a device that can correspond to the communication device 110 such as a wireless access point corresponds to the terminal 120, or cases where a device that can correspond to the terminal 120 such as a smartphone corresponds to the communication device 110.

The communication control device 130 is typically a device that determines, permits, gives an instruction on, and/or manages communication parameters of the communication device 110. For example, database servers called TV white space database (TVWSDB), geolocation database (GLDB), spectrum access system (SAS), and automated frequency coordination (AFC) correspond to the communication control device 130. In addition, for example, control devices such as a spectrum manager and a coexistence manager that perform radio wave interference control between devices, represented by EN 303 387 of the European Telecommunications Standards Institute (ETSI) and the Institute of Electrical and Electronics Engineers (IEEE) 802.19.1-2018 also correspond to the communication control device 130. Furthermore, for example, a registered location secure server (RLSS) defined in IEEE 802.11-2016 also corresponds to the communication control device 130. That is, not limited to these examples, an entity that determines, permits, gives an instruction on, and/or manages the communication parameters of the communication device 110 related to spectrum sharing may be referred to as the communication control device 130. Basically, the control target of the communication control device 130 is the communication device 110, but the communication control device 130 may control the terminal 120 subordinate to the communication device 110.

There may be a plurality of communication control devices 130. In a case where there is a plurality of communication control devices 130, at least one of the following three types of decision-making topologies can be applied to the communication control device 130.

Figure 3:
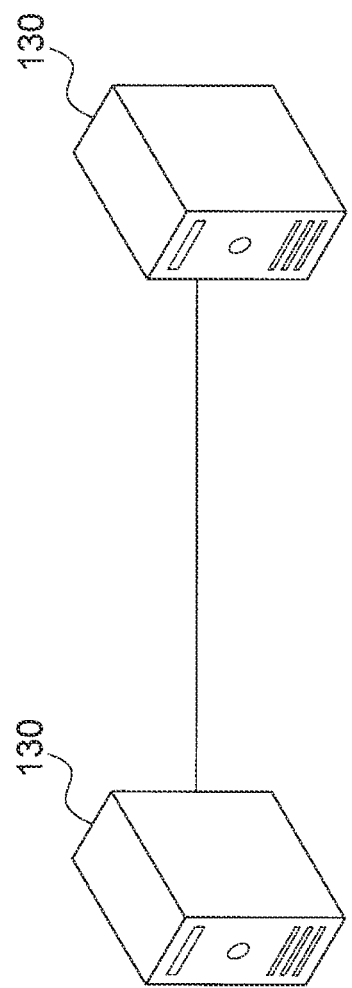
FIG. 3 is a diagram illustrating a network configuration to which autonomous decision-making can be applied.

Autonomous decision-making
Centralized decision-making
Distributed decision-making The autonomous decision-making is a decision-making topology in which an entity (the decision-making entity, here the communication control device 130) that makes a decision makes a decision independently from another decision-making entity. The communication control device 130 independently calculates necessary spectrum allocation and interference control. For example, in a case where a plurality of communication control devices 130 is arranged in a distributed manner as illustrated in FIG. 3, the autonomous decision-making can be applied.

Figure 4:
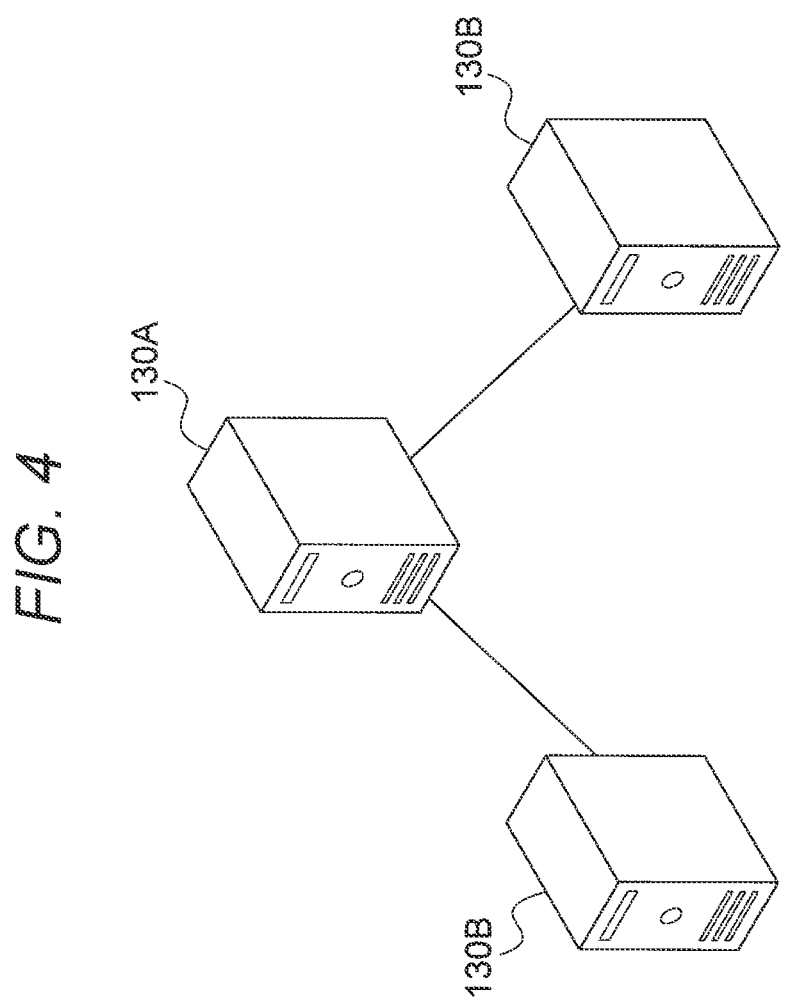
FIG. 4 is a diagram illustrating a network configuration to which centralized decision-making can be applied.

The centralized decision-making is a decision-making topology in which a decision-making entity delegates decision-making to another decision-making entity. In a case where the centralized decision making is performed, for example, a model as illustrated in FIG. 4 is assumed. FIG. 4 illustrates a model (what is called a master-slave type) in which one communication control device 130 centrally controls a plurality of communication control devices 130. In the model of FIG. 4, the communication control device 130A, which is the master, can control the communication control devices 130B, which are a plurality of slaves, to intensively make decisions.

The distributed decision-making (distributed decision-making) is a decision-making topology in which a decision-making entity makes a decision in cooperation with another decision-making entity. For example, while a plurality of communication control devices 130 independently makes a decision as in the autonomous decision-making in FIG. 3, mutual adjustment of decision-making results, negotiation, and the like performed by each communication control device 130 after making a decision may correspond to "distributed decision making". Furthermore, for example, in the centralized decision-making in FIG. 4, for the purpose of load balancing or the like, performing dynamic delegation of decision-making authority to each slave communication control device 130B, deletion thereof, or the like by the master communication control device 130A can also be regarded as "distributed decision-making".

Figure 5:
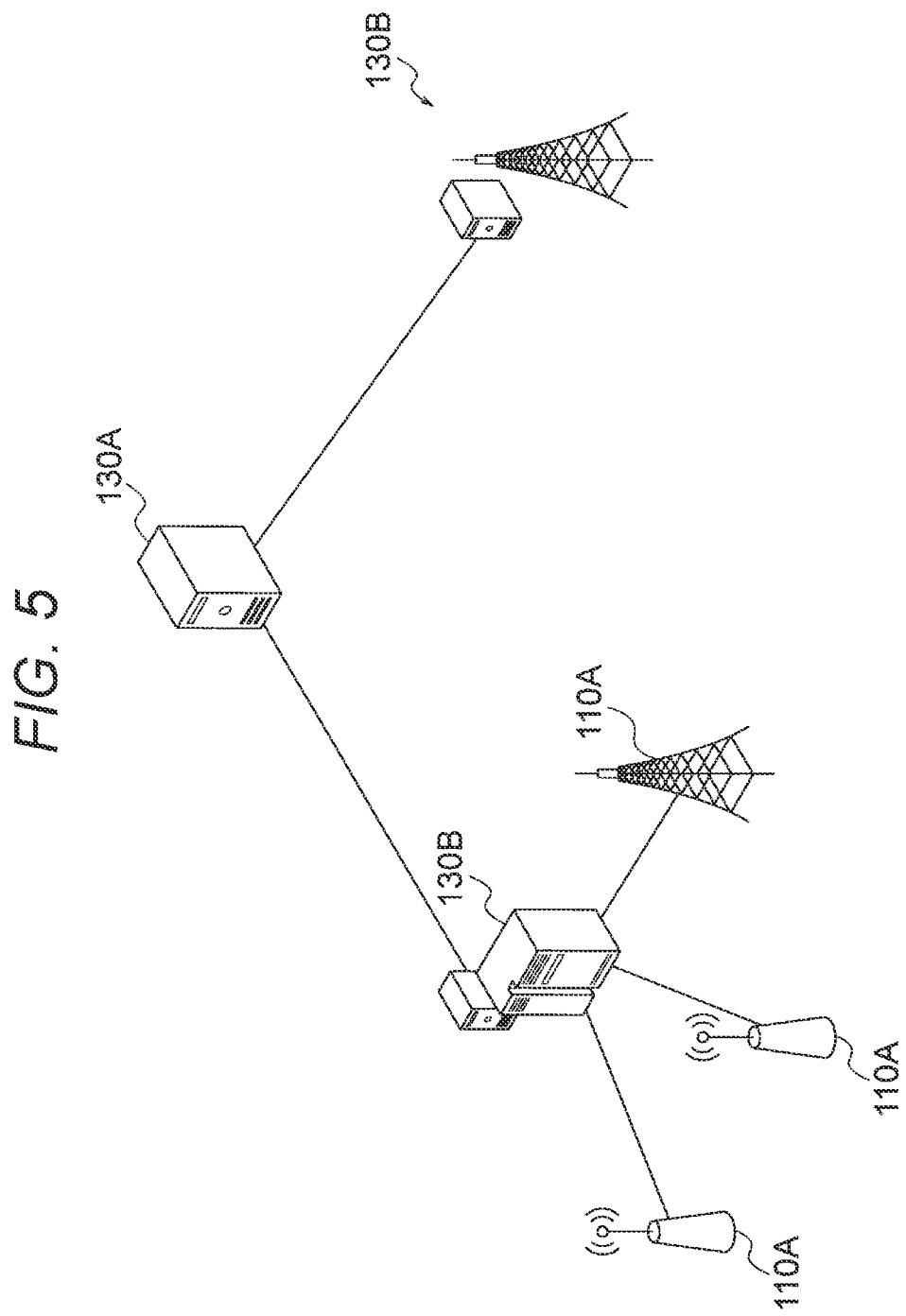
FIG. 5 is a diagram illustrating a network configuration in a case where both centralized decision-making and distributed decision-making are applied.

There may be cases where both the centralized decision-making and the distributed decision-making are applied. In FIG. 5, the slave communication control device 130B operates as an intermediate device that bundles the plurality of communication devices 110. It is not necessary for the master communication control device 130A to control the communication devices 110 bundled by the slave communication control device 130B, that is, the secondary system configured by the slave communication control device 130B. As described above, as a modification example, implementation as illustrated in FIG. 5 is also possible.

The communication control device 130 may also acquire necessary information from entities other than the communication device 110 and the terminal 120 of the communication network 100 for its role. Specifically, for example, information necessary for protecting the primary system can be acquired from a database (regulatory database) managed or operated by a radio administration agency (national regulatory authority (NRA)) of a country or a region. Examples of the regulatory database include the Universal Licensing System (ULS) operated by the Federal Communications Commission (FCC), and the like. Examples of information necessary for protecting the primary system include position information of the primary system, communication parameters of the primary system, out-of-band emission limit (OOBE), adjacent channel leakage ratio (ACLR), adjacent channel selectivity, fading margin, protection ratio (PR), and the like. In a region where a fixed numerical value, an acquisition method, a derivation method, and the like are defined by a law or the like in order to protect the primary system, it is desirable to use information defined by the law as information necessary for protecting the primary system.

Furthermore, a database that records the communication device 110 and the terminal 120 that have been subjected to conformity authentication, such as an equipment authorization system (EAS) managed by the Office of Engineering and Technology (OET) of the FCC, also corresponds to the regulatory database. From such a regulatory database, information regarding the operable spectrum of the communication device 110 and the terminal 120, information regarding the maximum EIRP, and the like can be acquired. Naturally, the communication control device 130 may use these pieces of information for protecting the primary system.

Furthermore, it can also be assumed that the communication control device 130 acquires radio wave sensing information from a radio wave sensing system installed and operated for the purpose of radio wave detection in the primary system. As a specific example, in Citizens Broadband Radio Service (CBRS) in the United States, the communication control device 130 acquires radio wave detection information of a ship radar as a primary system from a radio wave sensing system called an environmental sensing capability (ESC). Furthermore, in a case where the communication device 110 and the terminal 120 have a sensing function, the communication control device 130 may acquire radio wave detection information of the primary system from these.

The interface between the respective entities constituting this system model may be wired or wireless. For example, not only a wired line but also a wireless interface that does not depend on spectrum sharing may be used as an interface between the communication control device 130 and the communication device 110. Examples of the wireless interface that does not depend on spectrum sharing include a wireless communication line provided by a mobile communication carrier via a licensed band, Wi-Fi communication using an existing license-exempt band, and the like.

<1.2 Terms Related to Spectrum and Sharing>

As described above, the present embodiment will be described assuming a dynamic spectrum sharing (Dynamic Spectrum Access) environment. As a representative example of the dynamic spectrum sharing, a mechanism defined by the CBRS in the United States (that is, a mechanism defined in Part 96 Citizens Broadband Radio Service of the FCC Rules of the United States) will be described.

Figure 6:
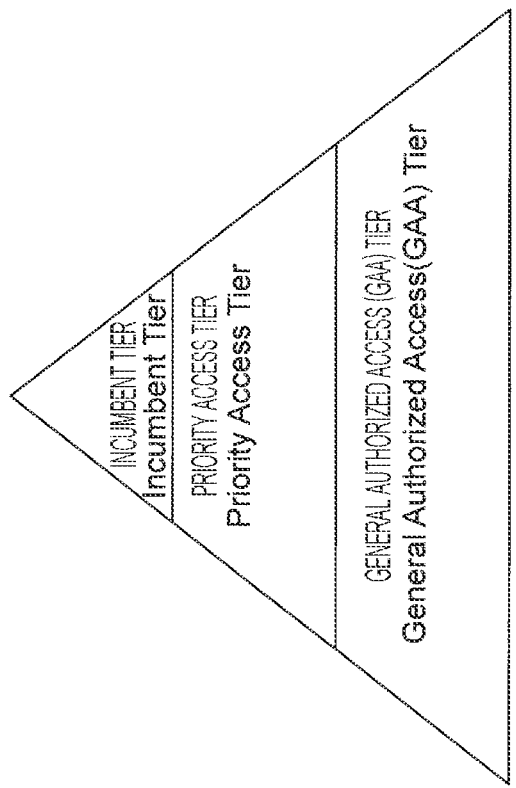
FIG. 6 is a diagram describing a three-tier structure in CBRS.

In the CBRS, as illustrated in FIG. 6, each of users in the shared frequency band is classified into one of three groups. This group is referred to as a tier. The three groups are referred to as an incumbent tier (existing layer), a priority access tier (priority access layer), and a general authorized access (GAA) tier (general authorized access layer), respectively.

The incumbent tier is a group including existing users who conventionally use a frequency band defined as a shared frequency band. The existing user is also generally referred to as a primary user. In the CBRS, the Department of Defense (DOD), fixed satellite operators, and new rule excepted radio broadband licensees (Grandfathered Wireless Broadband Licensees (GWBL)) in the United States are defined as existing users. The incumbent tier is not required to avoid interference to the priority access tier and the GAA tier with lower priorities or to suppress use of the shared frequency band. Furthermore, the incumbent tier is protected from interference by the priority access tier and the GAA tier. That is, users of the incumbent tier can use the shared frequency band without considering the existence of other groups.

The priority access tier is a group of users who use the shared frequency band on the basis of the above-described priority access license (PAL). A user of the priority access tier is also generally referred to as a secondary user. When the shared frequency band is used, the priority access tier is required to avoid interference and to suppress use of the shared frequency band for the incumbent tier having a higher priority than the priority access tier. On the other hand, neither avoiding interference nor suppressing use of the shared frequency band is required for the GAA tier having a lower priority than the priority access layer. Furthermore, the priority access tier is not protected from interference by the incumbent tier with a higher priority, but is protected from interference by the GAA tier with a lower priority.

The GAA tier is a group formed by shared frequency band users that do not belong to the incumbent tier and the priority access tier. Similarly to the priority access tier, in general, a user of the GAA tier is also referred to as a secondary user. However, since the priority of shared use is lower than that of the priority access tier, it is also referred to as a low priority secondary user. When the shared frequency band is used, the GAA tier is required to avoid interference and suppress use of the shared frequency band for the incumbent tier and the priority access tier having higher priorities. Furthermore, the GAA tier is not protected from interference by the incumbent tier and priority access tier with higher priority. That is, the GAA tier is a tier that is required to use an opportunistic shared frequency band in the laws.

Although the CBRS mechanism has been described above as a representative example of the dynamic spectrum sharing, the present embodiment is not limited to the definition of CBRS. For example, as illustrated in FIG. 6, the CBRS generally employs a three-tier structure, but a two-tier structure may be employed in the present embodiment. Typical examples of the two-tier structure include authorized shared access (ASA), licensed shared access (LSA), TV band white space (TVWS), and the like. In the ASA and the LSA, there is no GAA tier, and a structure equivalent to a combination of the incumbent tier and the priority access tier is employed. Further, in the TVWS, there is no priority access tier, and a structure equivalent to a combination of the incumbent tier and the GAA tier is employed. Furthermore, there may be four or more tiers. Specifically, for example, four or more tiers may be generated by providing a plurality of intermediate layers corresponding to the priority access tiers and giving different priorities to the respective intermediate layers, and the like. Furthermore, for example, the tiers may be increased by similarly dividing the GAA tier and giving priorities, and the like. That is, each group may be divided.

Furthermore, the primary system of the present embodiment is not limited to the definition of CBRS. For example, as an example of the primary system, a wireless system such as TV broadcasting, a fixed microwave line (fixed system (FS)), a meteorological radar, a radio altimeter, a wireless train control system (communications-based train control), and a radio astronomy is assumed and, without being limited thereto, any wireless system can be the primary system of the present embodiment.

Furthermore, as described above, the present embodiment is not limited to the environment of spectrum sharing. In general, in spectrum sharing or spectrum secondary use, an existing system that uses a target frequency band is referred to as a primary system, and a secondary user is referred to as a secondary system. However, in a case where the present embodiment is applied to an environment other than the spectrum sharing environment, they should be read by replacing with other terms. For example, a macrocell base station in a heterogeneous network (HetNet) may be the primary system, and a small cell base station or a relay station may be the secondary system. Furthermore, the base station may be a primary system, and a relay user equipment (UE) or a vehicle UE that implements D2D or V2X existing within its coverage may be the secondary system. The base station is not limited to a fixed type, and may be a portable type or a mobile type. In such a case, for example, the communication control device 130 of the present embodiment may be included in a core network, a base station, a relay station, a relay UE, or the like.

Furthermore, in a case where the present embodiment is applied to an environment other than the spectrum shared environment, the term "frequency" in the present disclosure is replaced with another term shared by the application destination. For example, terms such as "resource", "resource block", "resource element", "resource pool", "channel", "component carrier", "carrier", "subcarrier", and "bandwidth part (BWP)" or another term having a meaning equivalent or similar thereto are assumed to be used.

<<2. Description of Various Procedures Assumed in Present Embodiment>>

Here, a basic procedure that can be used in the implementation of the present embodiment will be described. Note that up to <2.5> described later will be described on the assumption that the processing is mainly performed in the communication device 110A.

<2.1 Registration Procedure>

A registration procedure is a procedure for registering information of a wireless system that intends to use the shared frequency band. More specifically, it is a procedure for registering a device parameter related to the communication device 110 of the wireless system in the communication control device 130. Typically, the registration procedure is started by that the communication device 110 representing a wireless system that intends to use the shared frequency band notifies the communication control device 130 of a registration request including a device parameter.

Note that in a case where a plurality of communication devices 110 belongs to the wireless system that intends to use the shared frequency band, the device parameter of each of the plurality of communication devices is included in the registration request. Furthermore, a device that transmits the registration request as a representative of the wireless system may be appropriately determined.

<2.1.1 Details of Required Parameters>

The device parameter refers to, for example, the following information.

- Information regarding the user of the communication device 110 (hereinafter described as user information)
- Information unique to the communication device 110 (hereinafter described as unique information)
- Information regarding the position of the communication device 110 (hereinafter described as position information)
- Information regarding an antenna included in the communication device 110 (hereinafter described as antenna information)
- Information regarding the wireless interface included in the communication device 110 (hereinafter described as wireless interface information)
- Legal information regarding the communication device 110 (hereinafter described as legal information)
- Information regarding the installer of the communication device 110 (hereinafter described as installer information)
- Information regarding the group to which the communication device 110 belongs (hereinafter, group information)

The device parameter is not limited to the above. Information other than these may be handled as the device parameter. Note that the device parameter does not need to be transmitted once, and may be transmitted a plurality of times. That is, a plurality of registration requests may be transmitted for one registration procedure. In this manner, one procedure or one process in the procedure may be performed a plurality of times. This similarly applies to the procedure described below.

The user information is information related to the user of the communication device 110. For example, a user ID, an account name, a user name, a user contact address, a call sign, and the like can be assumed. The user ID and the account name may be independently generated by the user of the communication device 110 or may be issued in advance by the communication control device 130. As the call sign, it is desirable to use a call sign issued by the NRA.

The user information can be used, for example, in an application of interference resolution. As a specific example, in the spectrum use notification procedure described in <2.5> to be described later, even if the communication control device 130 makes the use stop determination on the spectrum being used by the communication device 110 and gives an instruction based on the use stop determination, there may be a case where the spectrum use notification request of the spectrum is continuously notified. In this case, suspecting a failure of the communication device 110, the communication control device 130 can give a behavior check request for the communication device 110 to the user contact address included in the user information. Not limited to this example, in a case where it is determined that the communication device 110 is performing an operation against communication control performed by the communication control device 130, the communication control device 130 can make a contact using the user information.

The unique information is information that can specify the communication device 110, product information of the communication device 110, information regarding hardware or software of the communication device 110, and the like.

The information that can specify the communication device 110 can include, for example, a manufacturing number (serial number) of the communication device 110, an ID of the communication device 110, and the like. The ID of the communication device 110 may be uniquely assigned by the user of the communication device 110, for example.

The product information of the communication device 110 can include, for example, information regarding an authentication ID, a product model number, a manufacturer, and the like. The authentication ID is, for example, an ID given from a certificate authority in each country or region, such as an FCC ID in the United States, a CE number in Europe, and a technical standards conformity certification (technical conformity) in Japan. An ID issued by an industry association or the like on the basis of a unique authentication program may also be regarded as the authentication ID.

The unique information represented by these can be used, for example, in the application of a whitelist or a blacklist. For example, in a case where any piece of information regarding the communication device 110 in operation is included in the blacklist, the communication control device 130 can instruct the communication device 110 to stop using the spectrum in the spectrum use notification procedure described in <2.5> described later. Moreover, the communication control device 130 can take a behavior of not canceling the usage stop measure until the communication device 110 is cancelled from the blacklist. Furthermore, for example, the communication control device 130 can reject registration of the communication device 110 included in the blacklist. Furthermore, for example, the communication control device 130 can also perform an operation that does not consider the communication device 110 corresponding to the information included in the blacklist in the interference calculation of the present disclosure or that considers only the communication device 110 corresponding to the information included in the whitelist in the interference calculation.

The information regarding the hardware of the communication device 110 can include, for example, transmission power class information. For example, in FCC Code of Federal Regulations (C.F.R.) Part 96 in the United States, two types of classes Category A and Category B are defined as the transmission power class information, and information regarding the hardware of the communication device 110 conforming to the definition can include information regarding which of the two types of classes it belongs to. Furthermore, in Technical Specification (TS) 36.104 and TS38.104 of 3rd Generation Partnership Project (3GPP), some classes of eNodeB and gNodeB are defined, and these definitions can also be used.

The transmission power class information can be used, for example, in an application of interference calculation. The interference calculation can be performed using the maximum transmission power defined for each class as the transmission power of the communication device 110.

The information regarding the software of the communication device 110 can include, for example, version information, a build number, and the like regarding an execution program in which processing necessary for interaction with the communication control device 130 is described. Furthermore, version information, a build number, and the like of software for operating as the communication device 110 may also be included.

The position information is typically information that can specify the position of the communication device 110. For example, it is coordinate information acquired by a positioning function represented by the Global Positioning System (GPS), Beidou, the Quasi-Zenith Satellite System (QZSS), Galileo, or the Assisted Global Positioning System (A-GPS). Typically, information related to latitude, longitude, ground level or sea level, altitude, and positioning error can be included. Alternatively, for example, the position information may be position information registered in an information management device managed by the National Regulatory Authority (NRA) or its entrusted institution. Alternatively, for example, coordinates of an X axis, a Y axis, and a Z axis with a specific geographical position as an origin may be used. Furthermore, together with such coordinate information, an identifier indicating whether the communication device 110 exists outdoors or indoors can be given.

Furthermore, the position information may be information indicating a region in which the communication device 110 is located. For example, information indicating a region determined by the government, such as a postal code or an address, may be used. Furthermore, for example, the region may be indicated by a set of three or more geographic coordinates. These pieces of information indicating the region may be provided together with the coordinate information.

Furthermore, in a case where the communication device 110 is located indoors, information indicating the floor of a building where the communication device 110 is located can also be included in the position information. For example, an identifier indicating the number of floors, the ground, or the underground, or the like can be included in the position information. Furthermore, for example, information indicating a further closed space inside a building, such as a room number and a room name in the building, can be included in the position information.

Typically, the positioning function is desirably included in the communication device 110. However, there may be cases where performance of the positioning function does not meet the required accuracy. Furthermore, even if performance of the positioning function satisfies the required accuracy, it may not always be possible to acquire the position information that satisfies the required accuracy depending on the installation position of the communication device 110. Therefore, a device different from the communication device 110 may include the positioning function, and the communication device 110 may acquire information related to the position from the device. The device having the positioning function may be an available existing device, or may be provided by an installer of the communication device 110. In such a case, it is desirable that the position information measured by the installer of the communication device 110 is written in the communication device 110.

The antenna information is typically information indicating performance, a configuration, and the like of an antenna included in the communication device 110. Typically, for example, information such as an antenna installation height, a tilt angle (downtilt), a horizontal orientation (azimuth), a boresight, an antenna peak gain, and an antenna model can be included.

Furthermore, the antenna information can also include information regarding a formable beam. For example, information such as a beam width, a beam pattern, and an analog or digital beamforming capability can be included.

Furthermore, the antenna information can also include information regarding performance and configuration of multiple input multiple output (MIMO) communication. For example, information such as the number of antenna elements and the maximum number of spatial streams can be included. Furthermore, codebook information to be used, weight matrix information, and the like can also be included. The weight matrix information includes a unitary matrix, a zero-forcing (ZF) matrix, a minimum mean square error (MMSE) matrix, and the like, which are obtained by singular value decomposition (SVD), eigen value decomposition (EVD), block diagonalization (BD), and the like. Furthermore, in a case where the communication device 110 includes a function such as maximum likelihood detection (MLD) that requires nonlinear calculation, information indicating the included function may be included in the antenna information.

Furthermore, the antenna information may include a zenith of direction, departure (ZoD). The ZoD is a type of radio wave arrival angle. Note that instead of being notified from the communication device 110, the ZoD may be estimated and notified by another communication device 110 from radio waves radiated from the antenna of the communication device 110. In this case, the communication device 110 may be a device that operates as a base station or an access point, a device that performs D2D communication, a moving relay base station, or the like. The ZoD may be estimated by a radio wave direction of arrival estimation technology such as multiple signal classification (MUSIC) or estimation of signal propagation via rotation invariance techniques (ESPRIT). Furthermore, the ZoD can be used by the communication control device 130 as measurement information.

The wireless interface information is typically information indicating a wireless interface technology included in the communication device 110. For example, identifier information indicating a technology used in GSM, CDMA2000, UMTS, E-UTRA, E-UTRA NB-IoT, 5G NR, 5G NR NB-IoT or a further next generation cellular system can be included as the wireless interface information. Furthermore, identifier information indicating a derivative technology based on Long Term Evolution (LTE)/5G such as MulteFire, Long Term Evolution-Unlicensed (LTE-U), or NR-Unlicensed (NR-U) can be included. Furthermore, identifier information indicating a standard technology such as a metropolitan area network (MAN) such as WiMAX or WiMAX2+ or a wireless LAN of the IEEE 802.11 series can also be included. Further, identifier information indicating a proprietary wireless technology can also be included. Furthermore, a version number or a release number of the technical specification that defines these technologies may also be included as the wireless interface information.

Furthermore, the wireless interface information can also include frequency band information supported by the communication device 110. For example, the frequency band information can be represented by an upper limit frequency, a lower limit frequency, a center frequency, a bandwidth, a 3GPP operating band number, or a combination of at least two of these, or the like. Furthermore, one or more pieces of frequency band information can be included in the wireless interface information.

The frequency band information supported by the communication device 110 can further include information indicating capability of a band extension technology such as carrier aggregation (CA) or channel bonding. For example, combinable band information or the like can be included. Further, the carrier aggregation can also include information regarding a band desired to be used as a primary component carrier (PCC) or a secondary component carrier (SCC).

Furthermore, the number of component carriers (the number of CCs) that can be aggregated at the same time can be included.

The frequency band information supported by the communication device 110 may further include information indicating a combination of frequency bands supported by the dual connectivity and the multi connectivity. In addition, information of another communication device 110 that cooperatively provides the dual connectivity and the multi connectivity may also be provided. The communication control device 130 may perform determination of the communication control disclosed in the present embodiment in consideration of another communication device 110 having a cooperative relationship or the like in subsequent procedures.

The frequency band information supported by the communication device 110 may also include information indicating radio wave usage priority such as PAL and GAA.

Furthermore, the wireless interface information can also include modulation scheme information supported by the communication device 110. For example, as a representative example, information indicating a primary modulation scheme such as frequency shift keying (FSK), n-value phase shift keying (PSK), where n is a multiplier of two, such as two, four, eight, or the like), and n-value quadrature amplitude modulation (QAM, where n is a multiplier of four, such as four, 16, 64, 256, 1024) can be included. Furthermore, information indicating a secondary modulation scheme such as orthogonal frequency division multiplexing (OFDM), scalable OFDM, DFT spread OFDM (DFT-s-OFDM), generalized frequency division multiplexing (GFDM), and filter bank multi carrier (FBMC) can be included.

Furthermore, the wireless interface information can also include information regarding an error correction code. For example, capabilities of a turbo code, a low density parity check (LDPC) code, a polar code, an erasure correction code, and the like, and coding rate information to be applied can be included.

The modulation scheme information and the information regarding the error correction code can also be expressed by a modulation and coding scheme (MCS) index as another aspect.

Furthermore, the wireless interface information can also include information indicating a function specific to each wireless technical specification supported by the communication device 110. For example, as a representative example, there is transmission mode (TM) information defined in LTE. In addition, those having two or more modes for a specific function can be included in the wireless interface information such as TM information. Furthermore, in the technical specification, in a case where the communication device 110 supports a function that is not essential in the specification even if there are not two or more modes, information indicating the supported function can also be included.

Furthermore, the wireless interface information can also include radio access technology (RAT) information supported by the communication device 110. For example, information indicating time division multiple access (TDMA), frequency division multiple access (FDMA), orthogonal frequency division multiple access (OFDMA), power division multiple access (PDMA), code division multiple access (CDMA), sparse code multiple access (SCMA), interleave division multiple access (IDMA), spatial division multiple access (SDMA), carrier sense multiple access/collision avoidance (CSMA/CA), carrier sense multiple access/collision detection (CSMA/CD), or the like can be included. Note that the TDMA, FDMA, and OFDMA are classified into orthogonal multiple access (OMA). The PDMA, CDMA, SCMA, IDMA, and SDMA are classified into non-orthogonal multiple access (NOMA). A representative example of the PDMA is a method implemented by a combination of superposition coding (SPC) and successive interference canceller (SIC). The CSMA/CA and CSMA/CD are classified into opportunistic access.

In a case where the wireless interface information includes information indicating the opportunistic access, information indicating details of the access method may be further included. As a specific example, information indicating which of frame based equipment (FBE) and load based equipment (LBE) defined in EN 301 598 of ETSI may be included.

In a case where the radio interface information indicates the LBE, the wireless interface information may further include LBE-specific information such as a priority class specified in EN 301 598 of ETSI.

Furthermore, the wireless interface information can also include information regarding a duplex mode supported by the communication device 110. As a representative example, information regarding a method such as frequency division duplex (FDD), time division duplex (TDD), or full duplex (FD) can be included for example.

In a case where TDD is included as the wireless interface information, TDD frame structure information used or supported by the communication device 110 can be added. Furthermore, information related to the duplex mode may be included for each frequency band indicated by the frequency band information.

In a case where the FD is included as the wireless interface information, information regarding an interference power detection level may be included.

Furthermore, the wireless interface information can also include information regarding a transmission diversity method supported by the communication device 110. For example, space time coding (STC) or the like may be included.

Furthermore, the wireless interface information can also include guard band information. For example, information regarding a predetermined guard band size in the wireless interface can be included. Alternatively, for example, information regarding a guard band size desired by the communication device 110 may be included.

Regardless of the aspects described above, the wireless interface information may be provided for each frequency band.

The legal information is typically information regarding regulations that the communication device 110 has to comply with and defined by the radio administration agency or an equivalent agency in each country or region, authentication information acquired by the communication device 110, or the like. Typically, the information regarding the regulations can include, for example, upper limit value information of out-of-band radiation, information regarding a blocking characteristic of the receiver, and the like. Typically, the authentication information can include, for example, type approval information, legal regulation information serving as a reference of authentication acquisition, and the like. The type approval information corresponds to, for example, FCC ID in the United States, the technical standards conformity certification in Japan, and the like. The legal regulation information corresponds to, for example, FCC regulation numbers in the United States, ETSI Harmonized Standard number in Europe, and the like.

Among the legal information, regarding numerical values, those defined in the standard specification of wireless interface technology may be substituted. The standard specification of the wireless interface technology corresponds to, for example, 3GPP TS36.104 or TS38.104. An adjacent channel leakage ratio (ACLR) is defined therein. Instead of the upper limit information of the out-of-band radiation, the upper limit of the out-of-band radiation may be derived and used using the ACLR defined in the standard specification. Further, the ACLR itself may be used as necessary. Furthermore, adjacent channel selectivity (ACS) may be used instead of the blocking characteristic. Further, these may be used in combination, or an adjacent channel interference ratio (ACIR) may be used. Note that, in general, the ACIR has the following relationship with the ACLR and ACS.

[Expression 1]

$$ACIR = \left(\frac{1}{ACS} + \frac{1}{ACLR}\right)^{-1} \quad (1)$$

Note that although Expression (1) uses true value expression, Expression (1) may be appropriately converted into logarithmic expression.

The installer information can include information capable of specifying a person who installs the communication device 110 (installer), unique information associated with the installer, and the like. Typically, the installer information can include information regarding a person who is responsible for the position information of the communication device 110, such as a certified professional installer (CPI) defined in Non-Patent Document 3. The CPI discloses certified professional installer registration ID (CPIR-ID) and CPI name. Furthermore, as unique information associated with the CPI, for example, a contact address (mailing address or contact address), an e-mail address, a telephone number, a public key identifier (PKI), and the like are disclosed. It is not limited thereto, and other information related to the installer may be included in the installer information as necessary.

The group information can include information regarding the communication device group to which the communication device 110 belongs. Specifically, for example, information related to the same or equivalent type of group as disclosed in WINNF-SSC-0010 can be included. Furthermore, for example, in a case where the communication carrier manages the communication devices 110 in units of groups according to its own operation policy, information regarding the groups can be included in the group information.

Figure 7:
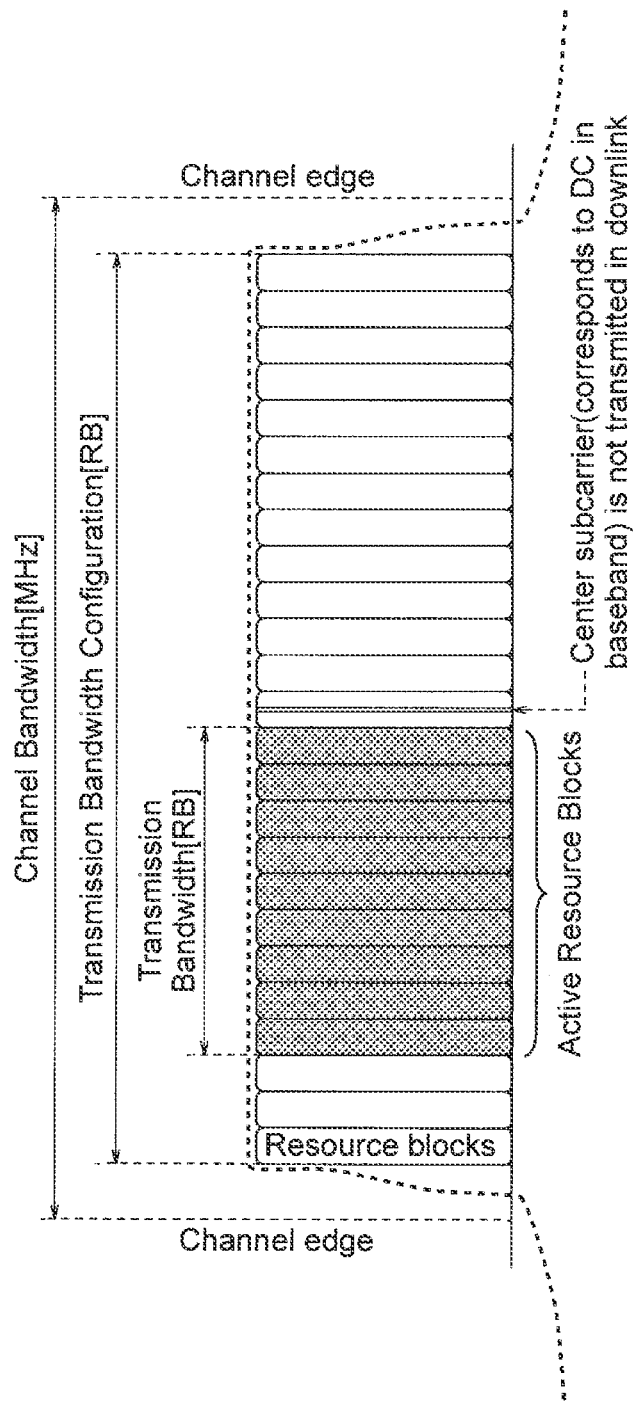
FIG. 7 is a diagram illustrating transmission bandwidth specifications of E-UTRA.
Figure 8:
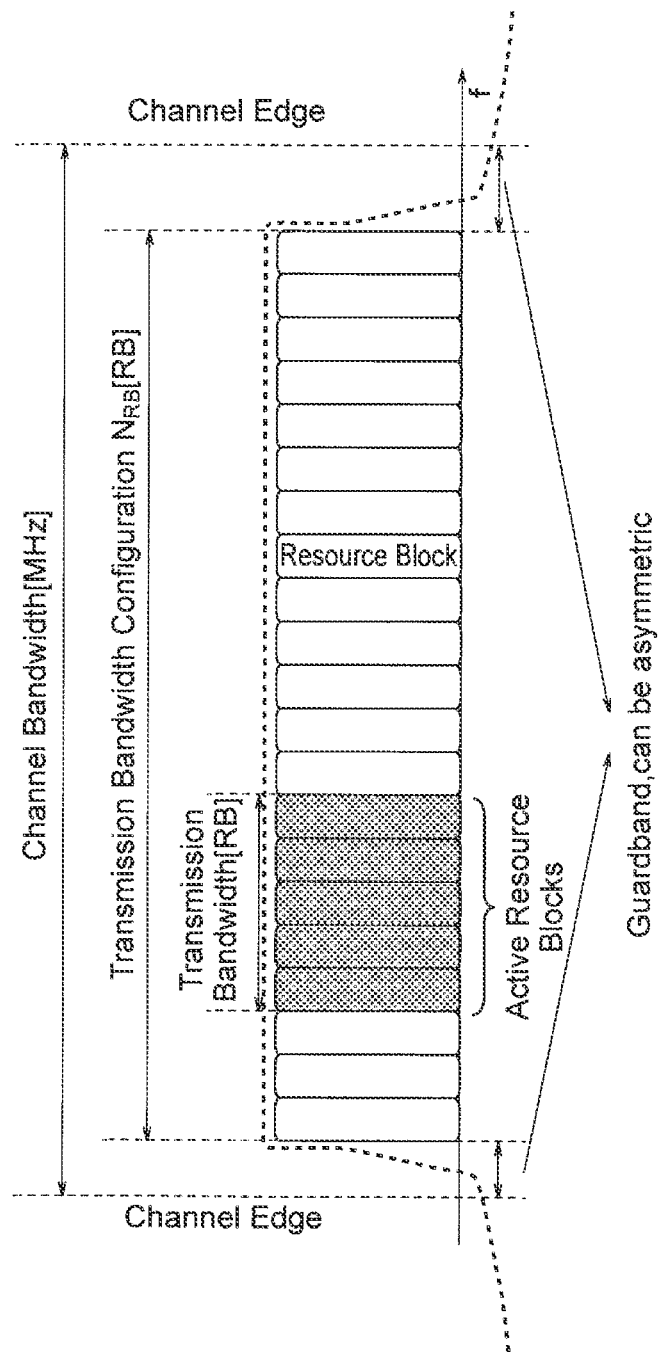
FIG. 8 is a diagram illustrating transmission bandwidth specifications of 5G NR.

The information listed so far may be estimated by the communication control device 130 from other information provided from the communication device 110 without the communication device 110 providing the information to the communication control device 130. Specifically, for example, the guard band information can be estimated from the wireless interface information. In a case where the wireless interface used by the communication device 110 is E-UTRA or 5G NR, it can be estimated on the basis of the transmission bandwidth specification of E-UTRA described in 3GPP TS 36.104 illustrated in FIG. 7, the transmission bandwidth specification of 5G NR described in 3GPP TS 38.104 illustrated in FIG. 8, and tables described in TS 38.104 illustrated below.

TABLE 1

Table 5.6-1 Transmission bandwidth configuration NRB in E-UTRA channel bandwidth (cited from Table 5.6-1 of TS 36.104 of 3GPP)

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

TABLE 2

Table 5.3.3-1: Minimum guardband (kHz) (FR1) (cited from Table 5.3.3-1 of TS 38.104 of 3GPP)

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

TABLE 3

Table: 5.3.3-2: Minimum guardband (kHz) (FR2) (cited from Table: 5.3.3-2 of TS 38.104 of 3GPP)

| SCS (kHz) | 50 MHz | 100 MHz | 200 MHz | 400 MHz |
|---|---|---|---|---|
| 60 | 1210 | 2450 | 4930 | N.A |
| 120 | 1900 | 2420 | 4900 | 9860 |

TABLE 4

Table: 5.3.3-3: Minimum guardband (kHz) of SCS 240 kHz SS/PBCH block (FR2) (cited from TS 38.104 Table: 5.3.3-3 of 3GPP)

| SCS (kHz) | 100 MHz | 200 MHz | 400 MHz |
|---|---|---|---|
| 240 | 3800 | 7720 | 15560 |

In other words, it is sufficient that the communication control device 130 can acquire the information listed so far, and the communication device 110 is not necessarily required to provide the information to the communication control device 130. Furthermore, the intermediate device 130B (for example, a network manager) that bundles the plurality of communication devices 110 does not need to provide the information to the communication control device 130A. Providing information by the communication device 110 or the intermediate device 130B to the communication control device 130 or 130A is merely one means of information provision in the present embodiment. The information listed so far means information that can be necessary for the communication control device 130 to normally complete this procedure, and means for providing the information does not matter.

<2.1.1.1 Supplement of Required Parameters>

In the registration procedure, in some cases, it is assumed that the device parameters related to not only the communication device 110 but also the terminal 120 are required to be registered in the communication control device 130. In such a case, the term "communication device" in the description given in <2.1.1> may be replaced with a term "terminal" or a similar term. Furthermore, a parameter specific to "terminal" that is not described in <2.1.1> may also be handled as a required parameter in the registration procedure. For example, there is a user equipment (UE) category specified in 3GPP, and the like.

<2.1.2 Details of Registration Processing>

As described above, the communication device 110) representing the wireless system that intends to use the shared frequency band generates a registration request including the device parameter and notifies the communication control device 130 of the registration request.

Here, in a case where the installer information is included in the device parameters, the communication device 110 may perform tamper-proof processing or the like on the registration request by using the installer information. Furthermore, a part or all of the information included in the registration request may be subjected to encryption processing. Specifically, for example, a unique public key may be shared in advance between the communication device 110 and the communication control device 130, and the communication device 110 may encrypt information using a secret key corresponding to the public key. Examples of the encryption target include security sensitive information such as position information.

Note that there may be cases where the ID and the position information of the communication device 110 are disclosed, and the communication control device 130 holds in advance the ID and the position information of the main communication device 110 existing in its coverage. In such a case, since the communication control device 130 can acquire the position information from the ID of the communication device 110 that has transmitted the registration request, the position information does not need to be included in the registration request. Furthermore, it is also conceivable that the communication control device 130 returns a necessary device parameter to the communication device 110 that has transmitted the registration request, and in response to this, the communication device 110 transmits a registration request including the device parameter necessary for registration. In this manner, the information included in the registration request may be different depending on the case.

After receiving the registration request, the communication control device 130 performs registration processing of the communication device 110 and returns a registration response according to a processing result. If there is no shortage or abnormality of information necessary for registration, the communication control device 130 records the information in an internal or external storage device and notifies of normal completion. Otherwise, a registration failure is notified. In a case where the registration is normally completed, the communication control device 130 may allocate an ID to each of the communication devices 110 and notify the communication devices of the ID information at the time of response. In a case where the registration fails, the communication device 110 may notify the corrected registration request again. Furthermore, the communication device 110 may change the registration request and try the registration procedure until it is normally completed.

Note that the registration procedure may be executed even after the registration is normally completed. Specifically, for example, the registration procedure can be re-executed in a case where the position information is changed beyond a predetermined standard due to movement, accuracy improvement, or the like. The predetermined standard is typically determined by the legal system in each country or region. For example, in 47 C.F.R. Part 15 in the United States, a Mode II personal/portable white space device, that is, a device using a free spectrum is required to perform registration again in a case where its position changes by 100 meters or more.

<2.2 Available Spectrum Information Query Procedure (Available Spectrum Query Procedure)>

The available spectrum information query procedure is a procedure in which a wireless system that intends to use a shared frequency band inquires of the communication control device 130 for information regarding an available spectrum. Note that the available spectrum information query procedure does not necessarily need to be performed. Furthermore, the communication device 110 that makes an inquiry on behalf of the wireless system that intends to use the shared frequency band may be the same as or different from the communication device 110 that has generated the registration request. Typically, the communication device 110 that makes an inquiry notifies the communication control device 130 of a query request including information that can specify the communication device 110, and thereby the procedure is started.

Here, typically, the available spectrum information is information indicating a spectrum in which the communication device 110 can safely perform secondary use without giving fatal interference to the primary system.

The available spectrum information is determined, for example, on the basis of a secondary use prohibited area called an exclusion zone. Specifically, for example, in a case where the communication device 110 is installed in the secondary use prohibited area provided for the purpose of protecting the primary system using the frequency channel F1, the communication device 110 is not notified of the frequency channel F1 as an available channel.

The available spectrum information can also be determined, for example, by the degree of interference to the primary system. Specifically, for example, in a case where it is determined that the critical interference is given to the primary system even outside the secondary use prohibited area, the frequency channel may not be notified as an available channel. An example of a specific calculation method is described in <2.2.2> described later.

Furthermore, as described above, there may be frequency channels that are not notified as available due to conditions other than primary system protection requirements. Specifically, for example, in order to avoid interference that may occur between the communication devices 110 in advance, there may be cases where a frequency channel being used by another communication device 110 existing in the vicinity of the communication device 110 is not notified as an available channel. In this manner, the available spectrum information set in consideration of interference with the other communication device 110 may be set as, for example, "use recommended frequency information" and provided together with the available spectrum information. That is, the "use recommended spectrum information" is desirably a subset of the available spectrum information.

Even in a case of affecting the primary system, if the influence can be avoided by reducing the transmission power, the same frequency as that of the primary system or the communication device 110 in the vicinity may be notified as an available channel. In such a case, typically, maximum allowable transmission power information is included in the available spectrum information. The maximum allowable transmission power is typically expressed by equivalent isotropic radiated power (EIRP). The present embodiment is not necessarily limited to this, and may be provided by, for example, a combination of antenna power (conducted power) and antenna gain. Moreover, the antenna gain may be set to an allowable peak gain for each spatial direction.

<2.2.1 Details of Required Parameters>

As the information that can specify the wireless system that intends to use the shared frequency band, for example, unique information registered at the time of the registration procedure, the above-described ID information, and the like can be assumed.

Furthermore, the query request can also include query requirement information. The query requirement information can include, for example, information indicating a frequency band for which it is desired to know whether or not it is available. Furthermore, for example, transmission power information can be included. The communication device 110 that makes an inquiry can include transmission power information, for example, in a case where it is desired to know only spectrum information in which it is likely that desired transmission power can be used. The query requirement information does not necessarily need to be included in the query request.

Furthermore, the query request can also include a measurement report. The measurement report includes a result of measurement performed by the communication device 110 and/or the terminal 120. Some or all of the measurement results may be represented by raw data or may be represented by processed data. For example, standardized metrics represented by reference signal received power (RSRP), reference signal strength indicator (RSSI), and reference signal received quality (RSRQ) can be used for measurement.

<2.2.2 Details of Available Spectrum Evaluation Processing>

After receiving the query request, the available spectrum is evaluated on the basis of the query requirement information. For example, as described above, the available spectrum can be evaluated in consideration of existence of the primary system, the secondary use prohibited area thereof, and the communication device 110 in the vicinity.

The maximum allowable transmission power information may be derived. Typically, the maximum allowable transmission power information is calculated by using allowable interference power information in the primary system or a protection zone thereof, calculation reference point information of an interference power level suffered by the primary system, registration information of the communication device 110, and a propagation loss estimation model. Specifically, as an example, it is calculated by the following mathematical expression.

[Expression 2]

$$P_{MaxTx(dBm)} = I_{Th(dBm)} + PL(d)_{(dB)} \qquad (2)$$

Here, $P_{MaxTx(dBm)}$ is the maximum allowable transmission power, $I_{Th(dBm)}$ is allowable interference power, d is a distance between a predetermined reference point and the communication device 110, and $PL(d)_{(dB)}$ is a propagation loss at the distance d. In Expression (2), the antenna gain in a transceiver is not included, but the antenna gain in the transceiver may be included according to the maximum allowable transmission power expression method (EIRP, conducted power, and the like) or the reception power reference point (antenna input point, antenna output point, and the like). Further, a safety margin or the like for compensating for variation due to fading may be included. Furthermore, feeder loss may be considered as necessary.

Furthermore, Expression (2) is described on the basis of the assumption that a single communication device 110 is an interference source (single station interference). For example, in a case where it is necessary to consider aggregated interference from a plurality of communication devices 110 at the same time, a correction value may be added. Specifically, for example, the correction value can be determined on the basis of three (fixed/predetermined, flexible, flexible minimized) interference margin methods disclosed in Non-Patent Document 4 (ECC Report 186).

Note that although Expression (2) is expressed using logarithms, as a matter of course, it may be used by converting into true numbers at the time of implementation. Furthermore, all parameters in logarithmic notation described in the present disclosure may be used by appropriately converting into true numbers.

Furthermore, in a case where the above-described transmission power information is included in the query requirement information, the available spectrum can be evaluated by a method different from the above-described method. Specifically, for example, in a case where it is assumed that desired transmission power indicated by transmission power information is used, when an estimated interference quantity is less than allowable interference power in the primary system or a protection zone thereof, it is determined that the frequency channel is available, and the communication device 110 is notified of the frequency channel.

Furthermore, for example, in a case where an area or a space in which the communication device 110 can use the shared frequency band is determined in advance similarly to an area of a radio environment map (REM), the available spectrum information may be simply derived on the basis of only coordinates (coordinates or latitude, longitude, and ground level of x-axis, y-axis, and z-axis of communication device 110) included in the position information of the communication device 110. Furthermore, for example, even in a case where a lookup table that associates coordinates of a position of the communication device 110 with available spectrum information is prepared, the available spectrum information described above may be derived on the basis of only the position information of the communication device 110. As described above, there are various methods for the method of determining the available spectrum, and it is not limited to the example of the present disclosure.

The evaluation of the available spectrum does not necessarily need to be performed after the query request is received. For example, after normal completion of the above-described registration procedure, the communication control device 130 may independently perform the procedure without a query request. In such a case, an REM, a lookup table, or an information table similar to those described above as an example may be created.

Furthermore, the radio wave use priority such as PAL or GAA may also be evaluated. For example, in a case where the registered device parameter or the query requirement includes information regarding the priority of radio wave use, it may be determined whether spectrum use is possible on the basis of the priority, and the notification may be made. Furthermore, for example, as disclosed in Non-Patent Document 3, in a case where information (In Non-Patent Document 3, it is referred to as a cluster list) regarding the communication device 110 that performs high priority use (for example, PAL) from the user is registered in the communication control device 130 in advance, evaluation may be performed on the basis of the information.

After the evaluation of the available spectrum is completed, the communication control device 130 notifies the communication device 110 of the evaluation result.

The communication device 110 may select a desired communication parameter by using the evaluation result received from the communication control device 130.

<2.3 Spectrum Grant Procedure>

The spectrum grant procedure is a procedure for the wireless system that intends to use the shared frequency band to receive the secondary use permission of the spectrum from the communication control device 130. The communication device 110 that performs the spectrum grant procedure as a representative of the wireless system may be the same as or different from the communication device 110 that has performed the procedure so far. Typically, the communication device 110 notifies the communication control device 130 of a spectrum use permission request including information that can specify the communication device 110, thereby starting the procedure. Note that, as described above, the available spectrum information query procedure is not essential. Therefore, the spectrum grant procedure may be performed next to the available spectrum information query procedure, or may be performed next to a registration procedure.

In the present embodiment, it is assumed that at least the following two types of spectrum use permission request methods can be used.

Designation method

Flexible method

The designation method is a request method in which the communication device 110 designates a desired communication parameter and requests the communication control device 130 to permit operation based on the desired communication parameter. The desired communication parameter includes, but is not particularly limited to, a frequency channel to be used, a maximum transmission power, and the like. For example, a wireless interface technology specific parameter (such as a modulation scheme or a duplex mode) may be designated. Furthermore, information indicating radio wave use priority such as PAL and GAA may be included.

The flexible method is a request method in which the communication device 110 designates only a requirement regarding a communication parameter and requests the communication control device 130 to designate a communication parameter that can be permitted for secondary use while satisfying the requirement. Examples of the requirement related to the communication parameter include, but are not particularly limited to, a bandwidth, a desired maximum transmission power, or a desired minimum transmission power, and the like. For example, a wireless interface technology specific parameter (such as a modulation scheme or a duplex mode) may be designated. Specifically, for example, one or more TDD frame structures may be selected in advance and notified.

Similarly to the query request, the spectrum use permission request may also include the measurement report in either the designation method or the flexible method. The measurement report includes a result of measurement performed by the communication device 110 and/or the terminal 120. The measurement may be represented by raw data or processed data. For example, standardized metrics represented by reference signal received power (RSRP), reference signal strength indicator (RSSI), and reference signal received quality (RSRQ) can be used for measurement.

Note that the scheme information used by the communication device 110 may be registered in the communication control device 130 at the time of the registration procedure described in <2.1>.

<2.3.1 Details of Spectrum Use Permission Processing>

After receiving the spectrum use permission request, the communication control device 130 performs spectrum use permission processing on the basis of the spectrum use permission request method. For example, using the method described in <2.2>, it is possible to perform the spectrum use permission processing in consideration of the primary system, the secondary use prohibited area, the presence of the communication device 110 in the vicinity, and the like.

In a case where the flexible method is used, the maximum allowable transmission power information may be derived using the method described in <2.2.2>. Typically, the maximum allowable transmission power information is calculated by using allowable interference power information in the primary system or a protection zone thereof, calculation reference point information of an interference power level suffered by the primary system, registration information of the communication device 110, and a propagation loss estimation model. Specifically, as an example, it is calculated by the above Expression (2).

Furthermore, as described above, Expression (2) is described on the basis of the assumption that the single communication device 110 is an interference source. For example, in a case where it is necessary to consider aggregated interference from a plurality of communication devices 110 at the same time, a correction value may be added. Specifically, for example, the correction value can be determined on the basis of three types of methods (Fixed/Predetermined, Flexible, Flexible Minimized) disclosed in Non-Patent Document 4 (ECC Report 186).

The communication control device 130 can use various propagation loss estimation models in a spectrum grant procedure, available spectrum evaluation processing for an available spectrum information query request, and the like. In a case where a model is designated for each application, it is desirable to use the designated model. For example, in Non-Patent Document 3 (WINNF-TS-0112), a propagation loss model such as Extended Hata (eHATA) or Irregular Terrain Model (ITM) is employed for each application. Of course, the propagation loss model is not limited thereto.

There are also propagation loss estimation models that require information regarding radio wave propagation paths. The information regarding the radio wave propagation path can include, for example, information indicating inside and outside of a line of sight (Line of Sight (LOS) and/or Non Line of Sight (NLOS)), topographical information (undulations, sea levels, and the like), environmental information (Urban, Suburban, Rural, Open Sky, and the like), and the like. When using the propagation loss estimation model, the communication control device 130 may estimate these pieces of information from the registration information of the communication device 110 or the information of the primary system that is already acquired. Alternatively, in a case where there is a parameter designated in advance, it is desirable to use the parameter.

In a case where the propagation loss estimation model is not designated in a predetermined application, the propagation loss estimation model may be selectively used as necessary. For example, when estimating the interference power to the other communication device 110, a model that is calculated with a small loss such as a free space loss model is used, but when estimating the coverage of the communication device 110, a model that is calculated with a large loss can be used.

Furthermore, in a case where the designated propagation loss estimation model is used, as an example, the spectrum use permission processing can be performed by evaluating an interference risk. Specifically, for example, in a case where it is assumed that desired transmission power indicated by transmission power information is used, when an estimated interference quantity is less than the allowable interference power in the primary system or a protection zone thereof, it is determined that use of the frequency channel can be permitted, and the communication device 110 is notified of the determination.

In any method of the designation method and the flexible method, similarly to the query request, the radio wave usage priority such as PAL or GAA may also be evaluated. For example, in a case where the registered device parameter or the query requirement includes information regarding the radio wave usage priority, it may be determined whether the spectrum use is possible on the basis of the priority, and the notification may be made. Furthermore, for example, in a case where information regarding the communication device 110 that performs high priority use (for example, PAL) from the user is registered in the communication control device 130 in advance, evaluation may be performed on the basis of the information. For example, in Non-Patent Document 3 (WINNF-TS-0112), information regarding the communication device 110 is referred to as a cluster list.

The spectrum use permission processing is not necessarily performed due to reception of the spectrum use permission request. For example, after the normal completion of the above-described registration procedure, the communication control device 130 may independently perform without the spectrum use permission request. Furthermore, for example, the spectrum use permission processing may be performed at regular intervals. In such a case, the above-described REM, lookup table, or an information table similar thereto may be created. Thus, the spectrum that can be permitted is determined only by the position information, and thus the communication control device 130 can quickly return a response after receiving the spectrum use permission request.

<2.4 Spectrum Use Notification (Spectrum Use Notification/Heartbeat)>

The spectrum use notification is a procedure in which the wireless system using the shared frequency band notifies the communication control device 130 of the use of the spectrum based on the communication parameter allowed to be used in the spectrum grant procedure. The communication device 110 that performs the spectrum use notification as a representative of the wireless system may be the same as or different from the communication device 110 that has performed the procedure so far. Typically, the communication device 110 notifies the communication control device 130 of a notification message including information that can specify the communication device 110.

The spectrum use notification is desirably performed periodically until the use of the spectrum is rejected from the communication control device 130. In that case, the spectrum use notification is also referred to as a heartbeat.

After receiving the spectrum use notification, the communication control device 130 may determine whether to start or continue the spectrum use (in other words, radio wave transmission at the permitted spectrum). Examples of the determination method include confirmation of the spectrum use information of the primary system. Specifically, it is possible to determine permission or rejection of start or continuation of spectrum use (radio wave transmission at the permitted frequency) on the basis of a change in the use spectrum of the primary system, a change in the spectrum use status of the primary system in which the radio wave usage is not steady (for example, a ship radar of CBRS in the United States), and the like. If the start or continuation is permitted, the communication device 110 may start or continue the spectrum use (radio wave transmission at the permitted spectrum).

After receiving the spectrum use notification, the communication control device 130 may command reconfiguration of the communication parameters to the communication device 110. Typically, in a response of the communication control device 130 to the spectrum use notification, reconfiguration of the communication parameters can be commanded. For example, information regarding recommended communication parameters (hereinafter, recommended communication parameter information) can be provided. The communication device 110 to which the recommended communication parameter information has been provided desirably performs the spectrum grant procedure described in <2.4> again using the recommended communication parameter information.

<2.5 Supplement of Various Procedures>

The procedures described above do not necessarily need to be implemented individually, as described below. For example, by substituting a third procedure including two different procedures, the two different procedures may be implemented. Specifically, for example, the registration request and the available spectrum information query request may be integrally notified. Furthermore, for example, the spectrum grant procedure and the spectrum use notification may be integrally performed. As a matter of course, it is not limited to these combinations, and three or more procedures may be performed integrally. Furthermore, as described above, one procedure may be separately performed a plurality of times.

Furthermore, the expression "to acquire" or an expression equivalent thereto in the present disclosure does not necessarily mean to acquire according to the procedure described in the present disclosure. For example, although it is described that the position information of the communication device 110 is used in the available spectrum evaluation processing, it means that the information acquired in the registration procedure does not necessarily need to be used, and in a case where the position information is included in an available spectrum query procedure request, the position information may be used. In other words, the procedure for acquisition described in the present disclosure is an example, and acquisition by other procedures is also permitted within the scope of the present disclosure and within the scope of technical feasibility.

Furthermore, the information described to be included in a response from the communication control device 130 to the communication device 110 may be actively notified from the communication control device 130 by a push method if possible. As a specific example, the available spectrum information, the recommended communication parameter information, a radio wave transmission continuation rejection notification, and the like may be notified by the push method.

<2.6 Various Procedures for Terminal>

So far, the description has been made mainly assuming the processing in the communication device 110A. However, in some embodiments, not only the communication device 110A but also the terminal 120 and the communication device 110B can operate under management of the communication control device 130. That is, a scenario in which the communication parameter is determined by the communication control device 130 is assumed. Even in such a case, basically, each procedure described in <2.1> to <2.4> can be used. However, unlike the communication device 110A, the terminal 120 and the communication device 110B need to use the spectrum managed by the communication control device 130 for the backhaul link, and cannot perform radio wave transmission without permission. Therefore, it is desirable to start backhaul communication for the purpose of accessing the communication control device 130 only after detecting a radio wave or an authorization signal transmitted by the communication device 110A (communication device 110 capable of providing wireless communication service or master communication device 110 of master-slave type).

On the other hand, under the management of the communication control device 130, there may be cases where, also in the terminal or the communication device 110B, an allowable communication parameter is set for the purpose of protecting the primary system. However, the communication control device 130 cannot know the position information and the like of these devices in advance. Furthermore, these devices are also likely to have mobility. That is, the position information is dynamically updated. Depending on the laws, in a case where the position information changes by a certain amount or more, re-registration to the communication control device 130 may be required in some cases.

In consideration of such various use forms of the terminal 120 and the communication device 110, in the operation form of the TVWS (Non-Patent Document 5) defined by the Office of Communications (Ofcom), the following two types of communication parameters are defined.

Generic operational parameters
Specific operational parameters

The generic operational parameters are communication parameters defined as "parameters that can be used by any slave WSD located within the coverage area of a predetermined master WSD (corresponding to the communication device 110)" in Non-Patent Document 5. A feature is that it is calculated by the WSDB without using the position information of the slave WSD.

The generic operational parameters can be provided by unicast or broadcast from the communication device 110 that is already permitted to perform radio wave transmission from the communication control device 130. For example, a broadcast signal represented by a contact verification signal (CVS) specified in Part 15 Subpart H of the FCC rule in the United States can be used. Alternatively, it may be provided by a broadcast signal specific to a wireless interface. Thus, the terminal 120 and the communication device 110B can be handled as the communication parameters used for radio wave transmission for the purpose of accessing the communication control device 130.

The specific operational parameters are communication parameters defined as "parameters usable by a specific slave white space device (WSD)" in Non-Patent Document 5. In other words, they are communication parameters calculated using the device parameter of the slave WSD corresponding to the terminal 120. A feature is that it is calculated by the white space database (WSDB) using the position information of the slave WSD.

<2.7 Procedure Occurring Between Communication Control Devices>
<2.7.1 Information Exchange>

The communication control device 130 can exchange management information with another communication control device 130. At least the following information is desirably exchanged.

Information related to communication device 110
Area information
Protection target system information The information related to the communication device 110 includes at least the registration information and the communication parameter information of the communication device 110 operating under permission of the communication control device 130. The registration information of the communication device 110 having no permitted communication parameter may be included.

The registration information of the communication device 110 is typically a device parameter of the communication control device 130 registered in the communication device 110 in the above-described registration procedure. Not all of the registered information is necessarily exchanged. For example, information that may correspond to personal information does not need to be exchanged. Furthermore, when the registration information of the communication device 110 is exchanged, the registration information may be encrypted and exchanged, or the information may be exchanged after the content of the registration information is made ambiguous. For example, information converted into a binary value or information signed using an electronic signature mechanism may be exchanged.

The communication parameter information of the communication device 110 is typically information related to the communication parameters currently used by the communication device 110. At least information indicating the use spectrum and the transmission power is desirably included. Other communication parameters may be included.

The area information is typically information indicating a predetermined geographical region. This information can include region information of various attributes in various modes.

For example, as in a PAL protection area (PPA) disclosed in Non-Patent Document 3 (WINNF-TS-0112), protection zone information of the communication device 110 serving as a high priority secondary system may be included in the area information. The area information in this case can be expressed by, for example, a set of three or more coordinates indicating the geographical position. Furthermore, for example, in a case where a plurality of communication control devices 130 can refer to a common external database, the area information is expressed by a unique ID, and the actual geographical region can be referred to from the external database using the ID.

Furthermore, for example, information indicating the coverage of the communication device 110 may be included. The area information in this case can also be expressed by, for example, a set of three or more coordinates indicating the geographical position. Further, for example, assuming that the coverage is a circle centered on the geographical position of the communication device 110, the coverage can also be expressed by information indicating the size of the radius. Furthermore, for example, in a case where a plurality of communication control devices 130 can refer to the common external database that records area information, the information indicating the coverage is expressed by a unique ID, and the actual coverage can be referred to from the external database using the ID.

Furthermore, as another aspect, information related to an area section determined in advance by an administration or the like can also be included. Specifically, for example, it is possible to indicate a certain region by indicating an address. Furthermore, for example, a license area or the like can be similarly expressed.

Furthermore, as still another aspect, the area information does not necessarily express a planar area, and may express a three-dimensional space. For example, it may be expressed using a spatial coordinate system. Furthermore, for example, information indicating a predetermined closed space such as a floor number, a floor, and a room number of a building may be used.

The protection target system information is, for example, information of a wireless system treated as a protection target, such as the aforementioned existing layer (incumbent tier). Examples of the situation in which this information needs to be exchanged include a situation in which cross-border coordination is required. It is well conceivable that different objects to be protected exist in the same band between neighboring countries or regions. In such a case, the protection target system information can be exchanged between different communication control devices 130 in different countries or regions to which the communication control devices belong as necessary.

As another aspect, the protection target system information may include information of a secondary licensee and information of the wireless system operated by the secondary licensee. The secondary licensee is specifically a lessee of the license, and for example, it is assumed that the secondary licensee borrows PAL from the holder and operates the wireless system owned by itself. In a case where the communication control device 130 performs the rent management independently, information of the secondary licensee and information of the wireless system operated by the secondary licensee can be exchanged with another communication control device for the purpose of protection.

These pieces of information can be exchanged between the communication control devices 130 regardless of the decision-making topology applied to the communication control device 130.

Furthermore, these pieces of information can be exchanged in various manners. An example thereof will be described below.

ID designation method
Period designation method
Region designation method
Dump method The ID designation method is a method of acquiring information corresponding to an ID given in advance to specify information managed by the communication control device 130. For example, it is assumed that the first communication control device 130 manages the communication device 110 with ID: AAA. At this time, the second communication control device 130 designates the ID: AAA to the first communication control device 130 and makes an information acquisition request. After receiving the request, the first communication control device 130 searches for information of ID: AAA, and notifies of information regarding the communication device 110 of ID: AAA, for example, registration information communication parameter information, and the like in response.

The period designation method is a method in which information satisfying a predetermined condition can be exchanged in a designated specific period.

Examples of the predetermined condition include the presence or absence of information update. For example, in a case where acquisition of information regarding the communication device 110 in the specific period is designated by a request, the registration information of the communication device 110 newly registered within the specific period can be notified in response. Furthermore, the registration information or the information of communication parameters of the communication device 110 whose communication parameter has been changed within the specific period can also be notified in response.

Examples of the predetermined condition include whether the predetermined condition is recorded by the communication control device 130. For example, in a case where acquisition of information regarding the communication device 110 in the specific period is designated in the request, the registration information or the information of the communication parameters recorded by the communication control device 130 in the period can be notified in response. In a case where the information is updated in the period, the latest information in the period can be notified. Alternatively, an update history may be notified for each piece of information.

In the region designation method, a specific region is designated, and information of the communication device 110 belonging to the region is exchanged. For example, in a case where acquisition of information regarding the communication device 110 in the specific region is designated by a request, the registration information or the information of the communication parameters of the communication device 110 installed in the region can be notified by a response.

The dump method is a method of providing all information recorded by the communication control device 130. At least information and area information related to the communication device 110 are desirably provided by the dump method.

The above description of the information exchange between the communication control devices 130 is based on a pull method. That is, it is a form in which information corresponding to the parameter designated in the request is responded, and can be implemented by the HTTP GET method as an example. However, it is not limited to the pull method, and information may be actively provided to another communication control device 130 by the push method. As an example, the push manner can be implemented by the HTTP POST method.

<2.7.2 Command or Request Procedure>

The communication control device 130 may execute a command or a request with each other. Specifically, as an example, there is reconfiguration of communication parameters of the communication device 110. For example, in a case where it is determined that the first communication device 110 managed by the first communication control device 130 is greatly interfered with by the second communication device 110 managed by the second communication control device 130, the first communication control device 130 may request the second communication control device 130 to change the communication parameter of the second communication device 110.

As another example, there is reconfiguration of the area information. For example, in a case where calculation of coverage information and protection zone information regarding the second communication control device 130 managed by the second communication device 110 is incomplete, the first communication control device 130 may request the second communication control device 130 to reconfigure the area information. Besides this, the area information reconfiguration request may be made for various reasons.

<2.8 Information Transmission Means>

A notification (signaling) between entities described above can be implemented via various media. S-UTRA or 5G NR will be described as an example. As a matter of course, it is not limited thereto when implementing.

<2.8.2 Signaling Between Communication Control Device 130 and Communication Device 110>

The notification from the communication device 110 to the communication control device 130 may be performed, for example, in an application layer. For example, the Hyper Text Transfer Protocol (HTTP) may be used. Signaling can be performed by describing required parameters in the message body of the HTTP according to a predetermined manner. Moreover, in the case of using the HTTP, notification from the communication control device 130 to the communication device 110 is also performed according to the HTTP response mechanism.

<2.8.3 Signaling Between Communication Device 110 and Terminal 120>

The notification from the communication device 110 to the terminal 120 may be performed using, for example, at least one of radio resource control (RRC) signaling, system information (SI), or downlink control information (DCI). Furthermore, examples of the downlink physical channel include a physical downlink control channel (PDCCH), a physical downlink shared channel (PDSCH), a physical broadcast channel (PBCH), an NR-PDCCH, an NR-PDSCH, an NR-PBCH, and the like, but the downlink physical channel may be implemented using at least one of these.

The notification from the terminal 120 to the communication device 110 may be performed using, for example, radio resource control (RRC) signaling or uplink control information (UCI). Furthermore, it may be implemented by using an uplink physical channel (physical uplink control channel (PUCCH), physical uplink shared channel (PUSCH), physical random access channel (PRACH)).

The signaling is not limited to the physical layer signaling described above, and the signaling may be performed at a higher layer. For example, at the time of implementation at the application layer, signaling may be implemented by describing a required parameter in a message body of the HTTP according to a predetermined manner.

<2.8.4 Signaling Between Terminals 120>

Figure 9:
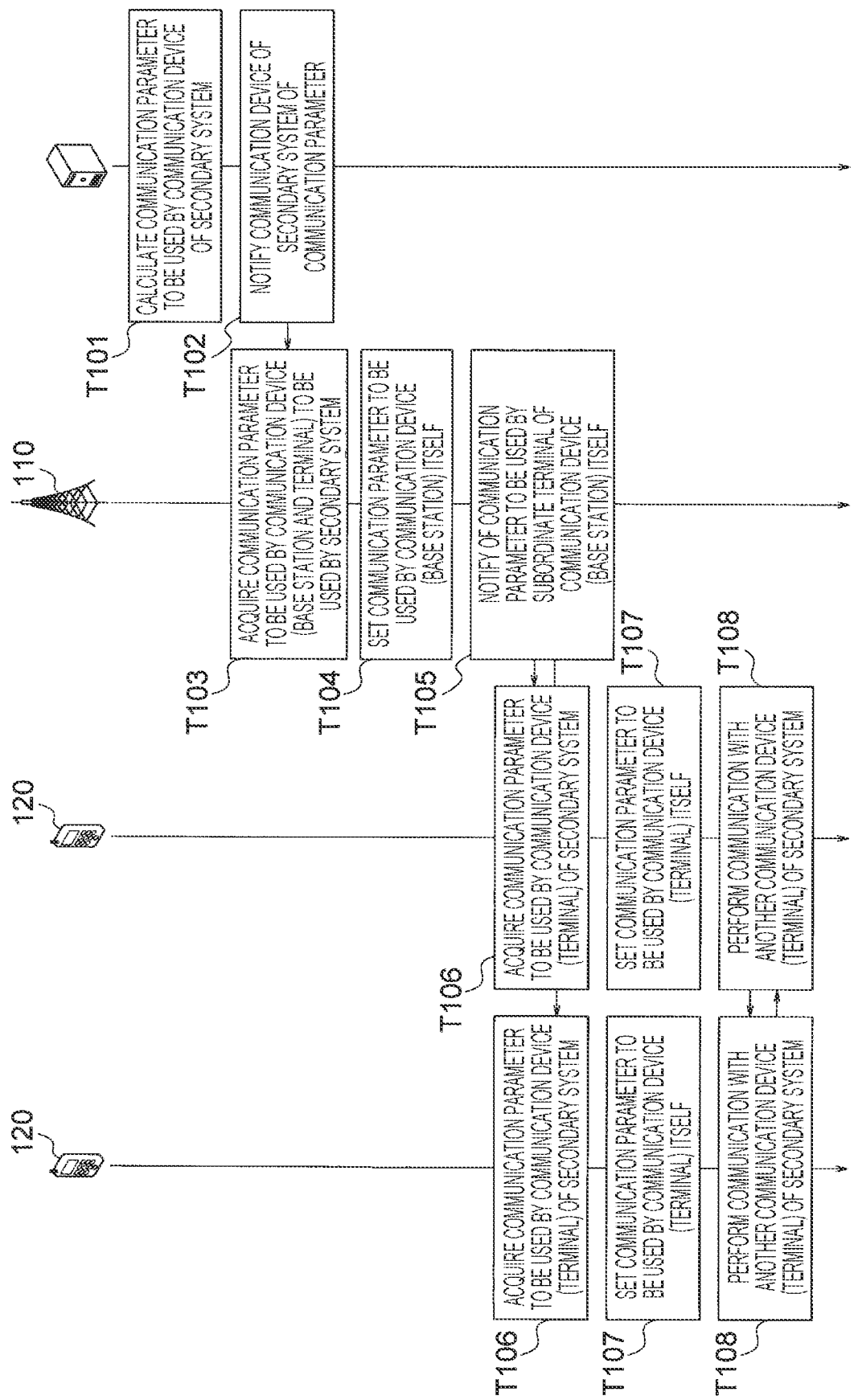
FIG. 9 is a diagram describing a flow of signaling between terminals.

FIG. 9 illustrates an example of a flow of signaling in a case where device-to-device (D2D) or vehicle-to-everything (V2X), which is communication between the terminals 120, is assumed as communication of the secondary system. The D2D or V2X which is communication between the terminals 120 may be performed using a physical sidelink channel (physical sidelink control channel (PSCCH), physical sidelink shared channel (PSSCH), physical sidelink broadcast channel (PSBCH)). The communication control device 130 calculates a communication parameter to be used by the secondary system (T101) and notifies the communication device 110 of the secondary system of the calculated communication parameter (T102). A value of the communication parameter may be determined and notified, or a condition indicating a range or the like of the communication parameter may be determined and notified. The communication device 110 acquires a communication parameter to be used by the secondary system (T103), and sets the communication parameter to be used by the communication device 110 itself (T104). Then, the terminal 120 is notified of a communication parameter to be used by the terminal 120 subordinate to the communication device 110 (T105). Each terminal 120 subordinate to the communication device 110 acquires (T106) and sets (T107) the communication parameter to be used by the terminal 120. Then, communication with another terminal 120 of the secondary system is performed (T108).

The communication parameter in a case where the target frequency channel for spectrum sharing is used in the sidelink (direct communication between the terminals 120) may be notified, acquired, or set in a form associated with a resource pool for sidelink in the target frequency channel. The resource pool is a radio resource for a sidelink set by a specific frequency resource or time resource. Examples of the frequency resource include a resource block, a component carrier, and the like. The time resource includes, for example, a radio frame, a subframe, a slot, a mini-slot, and the like. In a case where the resource pool is set in a frequency channel to be subjected to spectrum sharing, the resource pool is set in the terminal 120 by the communication device 110 on the basis of at least one of the RRC signaling, the system information, or the downlink control information. Then, the communication parameters to be applied in the resource pool and the sidelink are also set in the terminal 120 by the communication device 110 on the basis of at least one of the RRC signaling, the system information, or the downlink control information from the communication device 110 to the terminal 120. The notification of setting of the resource pool and the notification of the communication parameter to be used in the sidelink may be performed simultaneously or individually.

<<3. Procedure for Enabling Wireless Systems to Coexist>>

Moreover, in the dynamic spectrum sharing of the present embodiment, it is assumed that wireless communication of time division duplex (TDD) is performed, and when a shared frequency band is used, a procedure for a time synchronization of TDD is performed. This procedure enables coexistence of a plurality of wireless systems using the shared frequency band.

Furthermore, it is assumed that the TDD of the present embodiment has three modes related to time synchronization of synchronized operation, unsynchronized operation, and semi-synchronized operation (synchronization mode). In the present embodiment, a procedure for TDD time synchronization, that is, a process for enabling wireless systems to coexist is performed on the basis of the synchronization mode. Typically, the communication control device 130 performs the processing, and the communication control device 130 notifies the wireless system using the shared frequency band (specifically, the communication device 110 representing the wireless system) of the setting regarding the decided time synchronization and the like.

Note that the TDD time synchronization procedure may be performed as one of spectrum grant procedures or may be performed as one of available spectrum information query procedures.

Note that, as described above, the communication control device 130 may be a spectrum management database server such as SAS, or may be a coexistence manager (CxM or CM). A CxM for PALs may be provided that is different from the CxM provided for GAA. Further, it may also be provided as one CxM regardless of PAL and GAA. Furthermore, the communication control device 130 may be provided not as an external entity for such a wireless system but as one of internal entities.

For the procedure for time synchronization, the communication control device 130 acquires preferred synchronization mode information. The preferred synchronization mode information is information related to the preferred synchronization mode. The preferred synchronization mode is a synchronization mode that is preferred (preferable) for the wireless system that intends to use the shared frequency band. Note that the preferred synchronization mode is not limited to one. The preferred synchronization mode can also be said to be a synchronization mode allowed by the wireless system using the shared frequency band.

Furthermore, the communication control device 130 also acquires preferred/capable TDD frame structure information. The preferred/capable TDD frame structure information is information related to the preferred TDD frame structure and the capable TDD frame structure. The preferred TDD frame structure is a TDD frame structure that is preferred (preferable) for the wireless system that intends to use the shared frequency band. The capable TDD frame structure is a TDD frame structure that can be supported by a wireless system that intends to use the shared frequency band.

The preferred synchronization mode information or the preferred/capable TDD frame structure information may be provided to the registration procedure as part of the wireless interface information, for example. Further, Non-Patent Document 2 (CBRSA-TS-2001) discloses that information related to the TDD frame structure is provided as part of CBSD grouping information, and in the present embodiment, similarly, the preferred/capable TDD frame structure or preferred synchronization mode information may be provided as part of the CBSD grouping information. Furthermore, in a case where the communication control device 130 provides a dedicated interface, the preferred/capable TDD frame structure or the preferred synchronization mode information may be acquired via the interface.

Note that the information provided by the functions described in the present disclosure may be provided to the communication device 110 in the above procedure. Furthermore, an interface, an application programming interface (API), or the like for an operator that operates the communication device 110 may be provided in the communication control device 130, and information may be provided as the network installation assistance service via the interface, the API, or the like.

The preferred/capable TDD frame structure will be further described. In a case where wireless communication is performed in LTE, for example, configuration numbers illustrated in the following table may be included. Note that in the table, a symbol D represents that DL communication is performed in the subframe, a symbol U represents that UL communication is performed in the subframe, a symbol S represents a special subframe and represents that switching from the DL communication to the UL communication is performed in the subframe.

TABLE 5

Uplink-downlink allocations (cited from Table 5.1.-1 of TS 36.300 of 3GPP)

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Furthermore, in a case where wireless communication is performed in 5G NR, numerology information may be provided. The numerology information includes, for example, information illustrated in the following table.

TABLE 6

(Table 4.2-1 of TS 38.211 of 3GPP: cited from Supported transmission numerologies)

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Furthermore, the numerology information may include information indicated in the following table corresponding to the numerology.

TABLE 7

Number of OFDM symbols per slot, slots per frame, and slots per subframe for normal cyclic prefix (Cited from Table 4.3.2-1 of TS 38.211 of 3GPP)

| $\mu$ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 8

Number of OFDM symbols per slot, slots per frame, and slots per subframe for extended (Cited from Table 4.3.2-2 of TS 38.211 of 3GPP)

| $\mu$ | $N^{slot}_{symb}$ | $N^{frame, \mu}_{slot}$ | $N^{subframe, \mu}_{slot}$ |
|---|---|---|---|
| 2 | 12 | 40 | 4 |

TABLE 9

Transition time $N_{Rx-Tx}$ and $N_{Tx-Rx}$ (cited from Table 4.3.2-3 of TS 38.211 of 3GPP)

| Transition time | FR1 | FR2 |
|---|---|---|
| $N_{Tx-Rx}$ | 25600 | 13792 |
| $N_{Rx-Tx}$ | 25600 | 13792 |

Not limited to whether or not these pieces of information are included, information indicating the DL/UL configuration as illustrated in the following table, for example, a format number or the like is desirably included or estimated. Note that in this table, symbol F means flexible, and means that both the UL communication and the DL communication can be performed.

TABLE 10

Slot formats for normal cyclic prefix (cited from Table 11.1.1-1 of TS 38.213 V15.5.0 of 3GPP)

| Format | \multicolumn{14}{c}{Symbol number in a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} | | | | | | | | | | | | | |
| 255 | \multicolumn{14}{c}{UE determines the slot format for the slot based on TDD-UL-DL-ConfigurationCommon, or TDD-UL-DL-ConfigDedicated and, if any, on detected DCI formats} | | | | | | | | | | | | | |

In 5G NR, a bandwidth part (BWP) can be configured. However, under the management of the communication control device 130, a desired frequency channel is not necessarily available at the time of registration. Thus, after the first spectrum use notification procedure is completed and radio wave transmission becomes possible, the communication control device 130 may be notified of the slot format in each BWP through a re-registration procedure or the spectrum use notification procedure. Alternatively, a candidate of a desired frequency channel may be set in advance, a BWP may be configured on the assumption that each frequency channel can be used, and the communication control device 130 may be notified of the BWP together with the desired frequency channel information in the fixed type spectrum grant procedure. In the flexible type, relative spectrum position information of the BWP may be notified.

Furthermore, in a case where a plurality of TDD frame structures is included in the preferred/capable TDD frame structure, rank information indicating the order of preference (that is, priority) of these TDD frame structures may be included in the preferred/capable TDD frame structure.

Furthermore, it can be assumed that a situation in which the TDD frame structure of the wireless system using the shared frequency band needs to be changed by a new entrant or the like occurs. For such a case, fallback information may be included in the preferred/capable TDD frame structure. The fallback information in the preferred/capable TDD frame structure corresponds to the preferred/capable TDD frame structure in a case where the TDD frame structure of the wireless system using the shared frequency band is changed. Note that the preferred TDD frame structure or the capable TDD frame structure indicated in the fallback information may be the same as the preferred TDD frame structure or the capable TDD frame structure before using the shared frequency band. Furthermore, the fallback information may also include a plurality of TDD frame structures, and may include rank information for these.

The preferred synchronization mode information will be further described. The preferred synchronization mode information indicates synchronized operation, semi-synchronized operation, or unsynchronized operation. Furthermore, a plurality of synchronization modes may be indicated. For example, in a case where either the synchronized operation or the semi-synchronized operation will suffice, the two operations are illustrated. Furthermore, in a case where the plurality of synchronization modes is indicated in this manner, rank information indicating the order of priority (preference) may be provided.

Note that a dedicated parameter is not necessarily prepared to indicate the rank. For example, in a case where the information is expressed by a Javascript Object Notation array (JSON array), the storage order of elements may be treated as a rank. For example, in a case where the JSON object includes a parameter ("preferredSyncModes" in JSON) indicating the preferred synchronization mode having a plurality of elements as follows, the synchronized operation ("UNSYNCHRONIZED" in JSON) may be treated as the first place, and the semi-synchronized operation ("SEMI SYNCHRONIZED" in JSON) may be treated as the second place. That is, in a case where the rank (priority) of the synchronized operation is the highest and both the synchronized operation and the semi-synchronized operation can be selected, the synchronized operation is selected. Note that the following JSON object is merely an example.
<JSON Object1>

```
{
"preferredSyncModes" : [ "UNSYNCHRONIZED","SEMI_SYNCHRONIZED"]
}
```

Furthermore, it can be assumed that a situation in which the synchronization mode of the wireless system using the shared frequency band needs to be changed by a new entrant or the like occurs. For such a case, the preferred synchronization mode information may also include the fallback information. The fallback information in the preferred synchronization mode information corresponds to the preferred synchronization mode information in a case where the synchronization mode of the wireless system using the shared frequency band is changed. Note that the preferred synchronization mode indicated by the fallback information may be the same as the preferred synchronization mode before using the shared frequency band. Furthermore, the fallback information may also include a plurality of synchronization modes, and may include rank information for these synchronization modes.

For example, in a case where the preferred synchronization mode information includes the fallback information as follows, it means that basically the synchronized operation has a priority but may be switched to the semi-synchronized operation as necessary. In JSON, the fallback information is represented as capableFallbackSyncModes. Note that the following JSON object is merely an example.
<JSON Object2>

```
{
"preferredSyncModes" : [ "UNSYNCHRONIZED" ] ,
"capableFallbackSyncModes" : [ "SYNCHRONIZED" ]
}
```

Further, in a case where the preferred synchronization mode information includes the synchronized operation or the semi-synchronized operation, information of a phase clock reference or accuracy may be included. The phase clock reference is a reference time that the wireless system refers to align the start of the frame. For example, Coordinated Universal Time (UTC) may be used. Furthermore, the accuracy indicates an allowable range of error in a case where the communication device 110 is synchronized with the reference time. For example, in a case where communication is performed in LTE-TDD and 5G NR, the accuracy indicates information that accuracy is within 1.5 ρs before and after the reference time. Note that specification information of the wireless interface information may be substituted as the phase clock reference or the accuracy.

Figure 10:
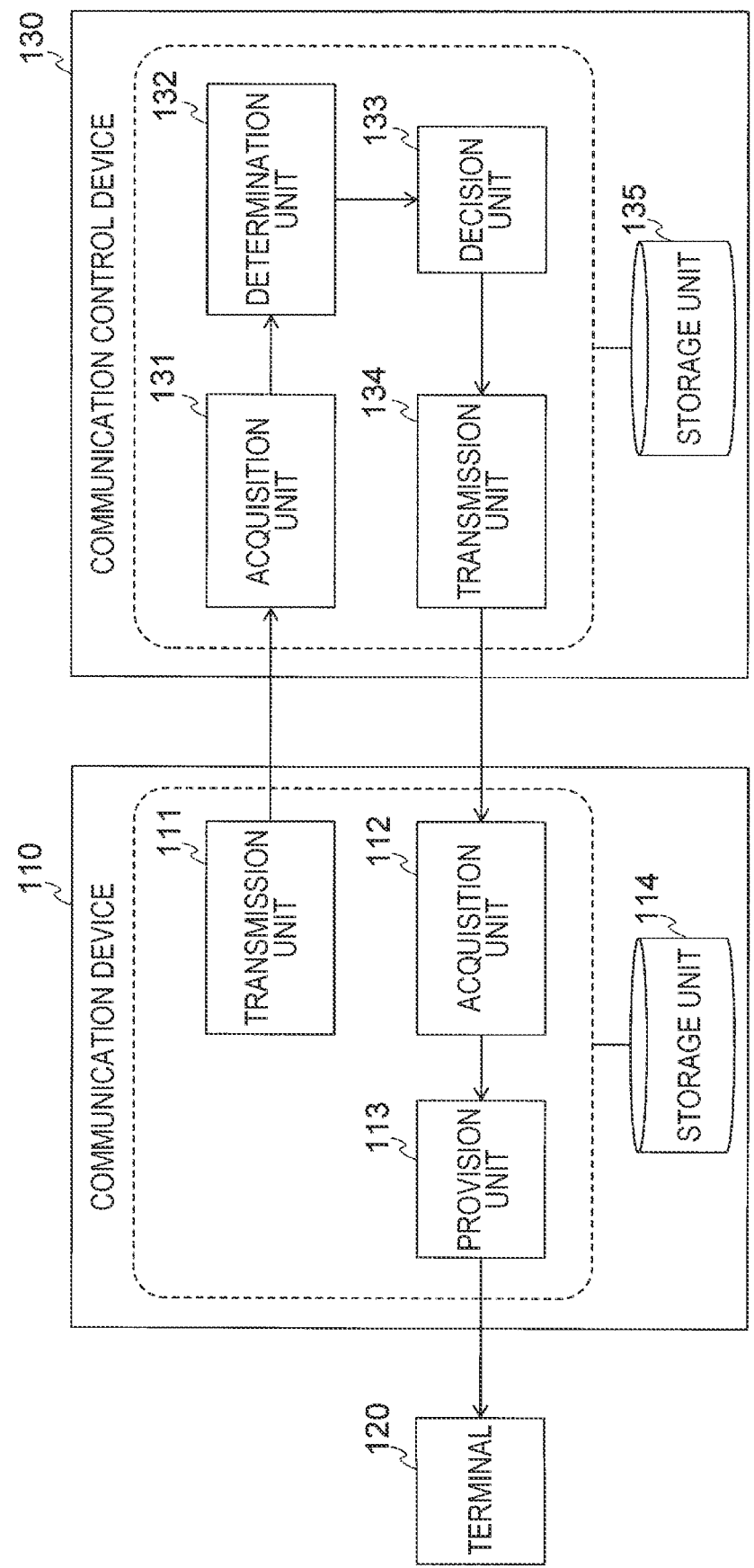
FIG. 10 is a diagram illustrating an example of internal configurations of a communication control device and a communication device for performing a procedure for time synchronization.

Configurations of the communication control device 130 and the communication device 110 for performing a procedure for time synchronization will be described. FIG. 10 is a diagram illustrating an example of internal configurations of the communication control device 130 and the communication device 110 for performing a procedure for time synchronization. The communication control device 130 illustrated in FIG. 10 includes an acquisition unit 131, a determination unit 132, a decision unit 133, a transmission unit 134, and a storage unit 135. Furthermore, the communication device 110 illustrated in FIG. 10 includes a transmission unit 111, an acquisition unit 112, a provision unit 113, and a storage unit 114.

Note that the components in FIG. 10 are for performing procedures for time synchronization, and the communication control device 130 and the communication device 110 may have a component or a function that is not illustrated or described. Further, the description of the present disclosure does not exclude components or functions not illustrated or described. Furthermore, when the components of FIG. 10 are implemented by software, a circuit, or the like, the components may be implemented by being subdivided, or may be implemented collectively. For example, it is assumed that the storage unit 135 of the communication control device 130 and the storage unit 114 of the communication device 110 store information necessary for the procedure for time synchronization, but the storage unit 135 and the storage unit 114 may include a plurality of memories.

Each processing of the components will be described with reference to a flowchart. Note that in the following description, the communication device 110 that notifies the communication control device 130 of the synchronization mode, in other words, the communication device 110 that attempts to use the shared frequency band is referred to as a target communication device 110. Furthermore, the communication device 110 that is already using the shared frequency band is referred to as an existing communication device 110.

Figure 11:
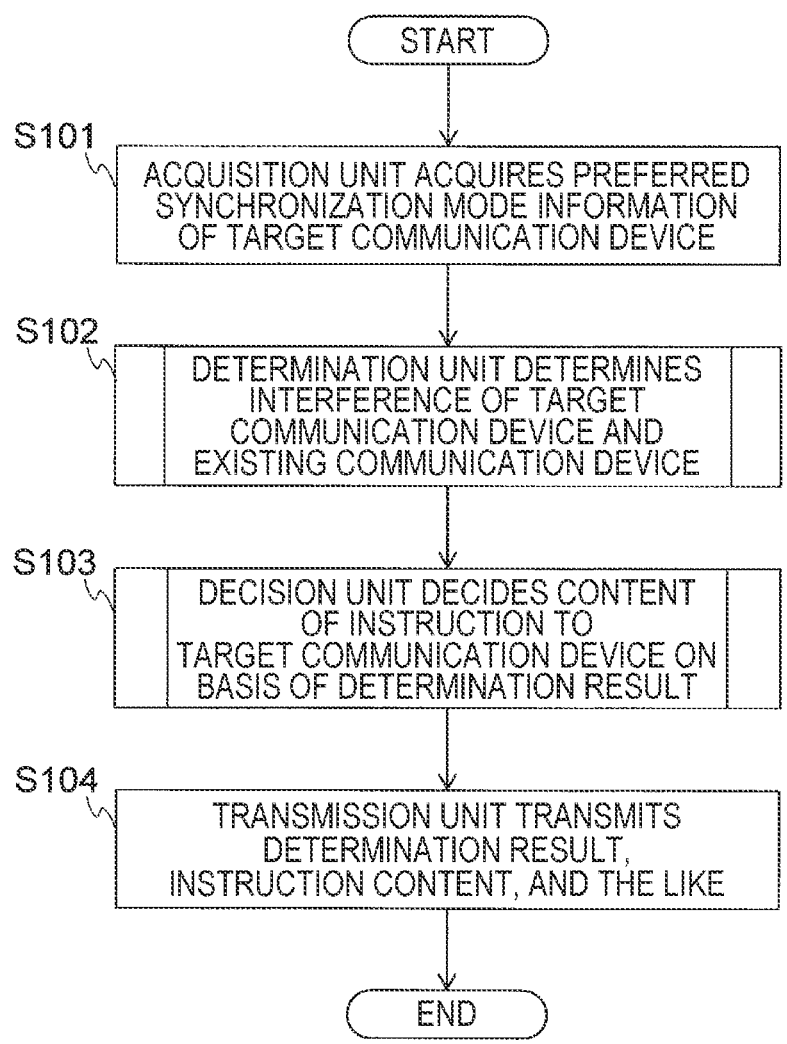
FIG. 11 is a schematic flowchart of a procedure for time synchronization of the communication control device.

FIG. 11 is a schematic flowchart of a procedure for time synchronization of the communication control device 130. The acquisition unit 131 acquires the preferred synchronization mode information of the target communication device 110 (S101). That is, the synchronization mode permitted by the target communication device 110 is acquired.

Note that, in FIG. 10, an arrow is illustrated from the transmission unit 111 of the communication device 110 to the acquisition unit 131 of the communication control device 130, but this does not limit the preferred synchronization mode information to be transmitted from the transmission unit 111 to the acquisition unit 131. As described above, there may be a wide variety of acquiring means. There may be a case where there is a device, such as a database, in which the information is stored, and the acquisition unit 131 acquires the information from the device. That is, the acquisition unit 131 does not necessarily acquire the information directly from the communication device 110. Furthermore, the communication control device 130 may estimate the information from other information. For example, the communication device 110 may transmit the preferred synchronization mode information by including only the synchronization mode that is not preferred therein, and the acquisition unit 131 may regard the rest excluding the received synchronization mode that is not preferred as the preferred synchronization mode. That is, the acquisition unit 131 may acquire the synchronization mode related to the target communication device 110, and use the acquired synchronization mode as it is if the acquired synchronization mode is the preferred synchronization mode or estimate the preferred synchronization mode on the basis of the acquired synchronization mode if the acquired synchronization mode is not the preferred synchronization mode.

The determination unit 132 determines whether or not the target communication device 110 and the existing communication device 110 interfere in a case of performing wireless communication by TDD in the shared frequency band (S102). The decision unit 133 decides content of the instruction to the target communication device 110 on the basis of the determination result and the synchronization mode allowed by the target communication device 110 (S103). For example, the synchronization mode, the frame structure, and the like used for the target communication device 110 are decided. The transmission unit 134 transmits the determination result, the instruction content, and the like to the target communication device 110 (S104). Note that transmission to the target communication device 110 may also be performed via another communication device 110. Furthermore, the transmission may be performed by the pull method as a response to transmission of the preferred synchronization mode information or the like, or may be actively notified by the push method from the communication control device 130.

Next, details of determination processing (S102) of the determination unit 132 and decision processing (S103) of the decision unit 133 will be described with reference to a flowchart. Note that when these processes are performed, there are a case where the spectrum used by the target communication device 110 is already allocated in the shared frequency band and a case where the spectrum is not yet allocated therein. Here, these two cases will be described separately.

For example, in the CBRS in the United States, a PAL to which the spectrum is allocated is delivered. Furthermore, the spectrum to be allocated may be decided by auction, examination by comparison with other wireless systems, or the like. In such a case, a flowchart in a case where the spectrum to be used is already allocated is used. On the other hand, there is a method such as a per-location license method which is scheduled to be employed by the Office of Communications (Ofcom UK). In the per-location license method, the spectrum is allocated simultaneously with authorization of the base station (corresponding to the communication device 110). Therefore, in the per-location license method, a flowchart in a case where the spectrum to be used is not yet allocated is used.

Figure 12:
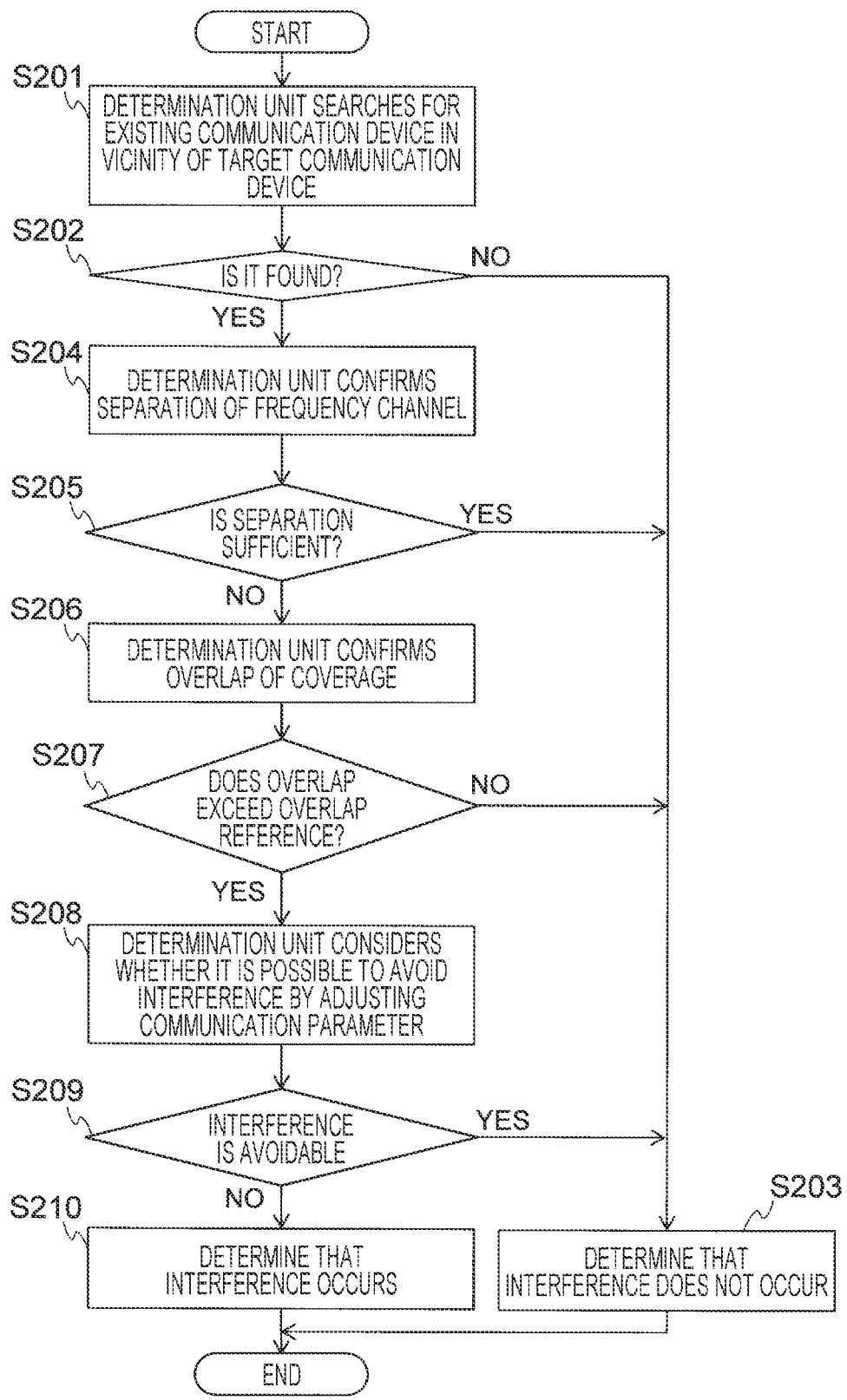
FIG. 12 is a flowchart of determination processing in a case where a spectrum to be used is already allocated.

FIG. 12 is a flowchart of determination processing in a case where the spectrum to be used is already allocated. The determination unit 132 searches for a wireless system in the vicinity of the target communication device 110 on the basis of the registered installation position and the like (S201). The "vicinity" may be appropriately determined according to topography or the like. For example, the inside of a circle having a radius of a predetermined distance (isolation distance) and centered on the target communication device 110 is defined as "vicinity", and it is confirmed whether the existing communication device 110 exists inside the circle. A Euclidean distance to the target communication device 110 with respect to each registered communication device 110 may be calculated, and when the distance is within the isolation distance, it may be regarded as the existing communication device 110 in the vicinity.

In a case where the existing communication device 110 in the vicinity is not found (NO in S202), the determination unit 132 determines that "interference does not occur" (S203), and the flow ends. Note that even if there is an existing communication device 110 in the vicinity, when a predetermined condition is satisfied, the determination unit 132 may consider that the existing communication device 110 in the vicinity has not been found. As the predetermined condition, for example, it is conceivable that the operator managing the communication device 110 is the same. This is because it is conceivable that the same operator would operate so that no interference occurs between the target communication device 110 and the existing communication device 110 in the vicinity. In this case, the communication control device 130 refers to the registration information stored in the storage unit 135 and confirms the operator (owner) of the existing communication device 110 in the vicinity of the target communication device 110.

In a case where the existing communication device 110 in the vicinity is found (YES in S202), the determination unit 132 confirms a separation of allocated spectra between the found wireless system and the target communication device 110 (S204). In a case where the separation of the spectra is larger than a predetermined separation spectrum, it is considered that the isolation is sufficient. The predetermined separation spectrum may be appropriately determined. For example, it may be determined according to the guard band size included in the wireless interface information.

In a case where the isolation is sufficient (YES in S205), the determination unit 132 determines that the "interference does not occur" (S203), and the flow ends. In a case where the isolation is insufficient (NO in S205), the determination unit 132 confirms an overlap (overlap) between the coverage of the target communication device 110 and the coverage of the existing communication device 110 in the vicinity.

For the coverage, for example, a geographical area capable of achieving a predetermined signal-noise ratio (SNR) may be set as the coverage. For example, a desired magnitude of transmission power at the time of using the shared frequency band may be acquired from the target communication device 110, and the SNR and the coverage may be calculated on the basis of the transmission power. Alternatively, in a case where a protection area based on the position of the communication device 110 is set similarly to PAL Protection Area of CBRS in the United States, the protection area may be treated as the coverage. Furthermore, in a case where the target communication device 110 or the existing communication device 110 is installed in a building (indoor), the communication control device 130 may consider attenuation (penetration loss) upon passing through the building when deciding the coverage.

In a case where the overlap of the coverages does not exceed the predetermined reference (overlap reference) (NO in S207), determination unit 132 determines that the "interference does not occur" (S203), and the flow ends. In a case where the coverages do not overlap (there is no overlapping area), it is surely assumed that the overlap reference is not exceeded, and it is determined that the interference does not occur. In this manner, even in a case where the coverages overlap, when the overlap reference is not exceeded, it may be regarded as allowable and that the interference does not occur.

The overlap reference may be appropriately determined. The overlap reference may be decided on the basis of, for example, a maximum allowable amount of interference calculated on the basis of a predetermined protection ratio or a signal power to interference power ratio (SIR). Furthermore, the overlap reference may also be decided on the basis of a threshold of the CLI.

In a case where the overlap exceeds the overlap reference (YES in S207), the determination unit 132 considers whether the interference is avoidable by adjusting the communication parameter for the target communication device 110 to provide the TDD wireless communication service in the shared frequency band, that is, whether the overlap reference is no longer exceeded (S208). For example, in the flexible method described above, in a case where the communication device 110 specifies only a requirement regarding the communication parameter, the determination unit 132 searches for the communication parameter that does not cause the interference while satisfying the requirement. Furthermore, for example, the communication device 110 considers whether the interference is avoidable by adjusting the communication parameter that is not designated in the above-described designation method.

For example, transmission power that is the communication parameter may be reduced. Thus, the coverage is narrowed, and the overlap reference can be prevented from being exceeded. Further, for example, the direction of the transmission radio wave (the direction of the beam) that is the communication parameter may be adjusted. Thus, the coverage changes, and it is possible to prevent the overlap reference from being exceeded. Furthermore, the number of active resource blocks (transmission bandwidth) that is the communication parameter may be adjusted. Thus, an effect equivalent to the setting of the guard band can be obtained.

Furthermore, an overlap and a change in the communication parameter may be decided in consideration of an interference direction between the target communication device 110 and the existing communication device 110. For example, there may occur that the target communication device 110 interferes with the existing communication device 110 but the existing communication device 110 does not interfere with the target communication device 110. Therefore, in a case where the interference is unidirectional, the communication parameter for one that is interfered but does not interfere may not be changed, and the communication parameter for one that is not interfered but does interfere may be changed.

In a case where the overlap reference is exceeded even if the communication parameter is changed, it is determined that it is unavoidable. Furthermore, in order not to exceed the overlap reference, when the communication parameter needs to be adjusted beyond an allowable range specified by the flexible method, it is determined that it is unavoidable.

In a case where it is determined that the interference is avoidable (YES in S209), the determination unit 132 determines that the "interference does not occur" (S203), and the flow ends. In a case where it is determined that the interference is unavoidable (NO in S209), the determination unit 132 determines that the "interference occurs" (S210), and the flow ends.

Figure 13:
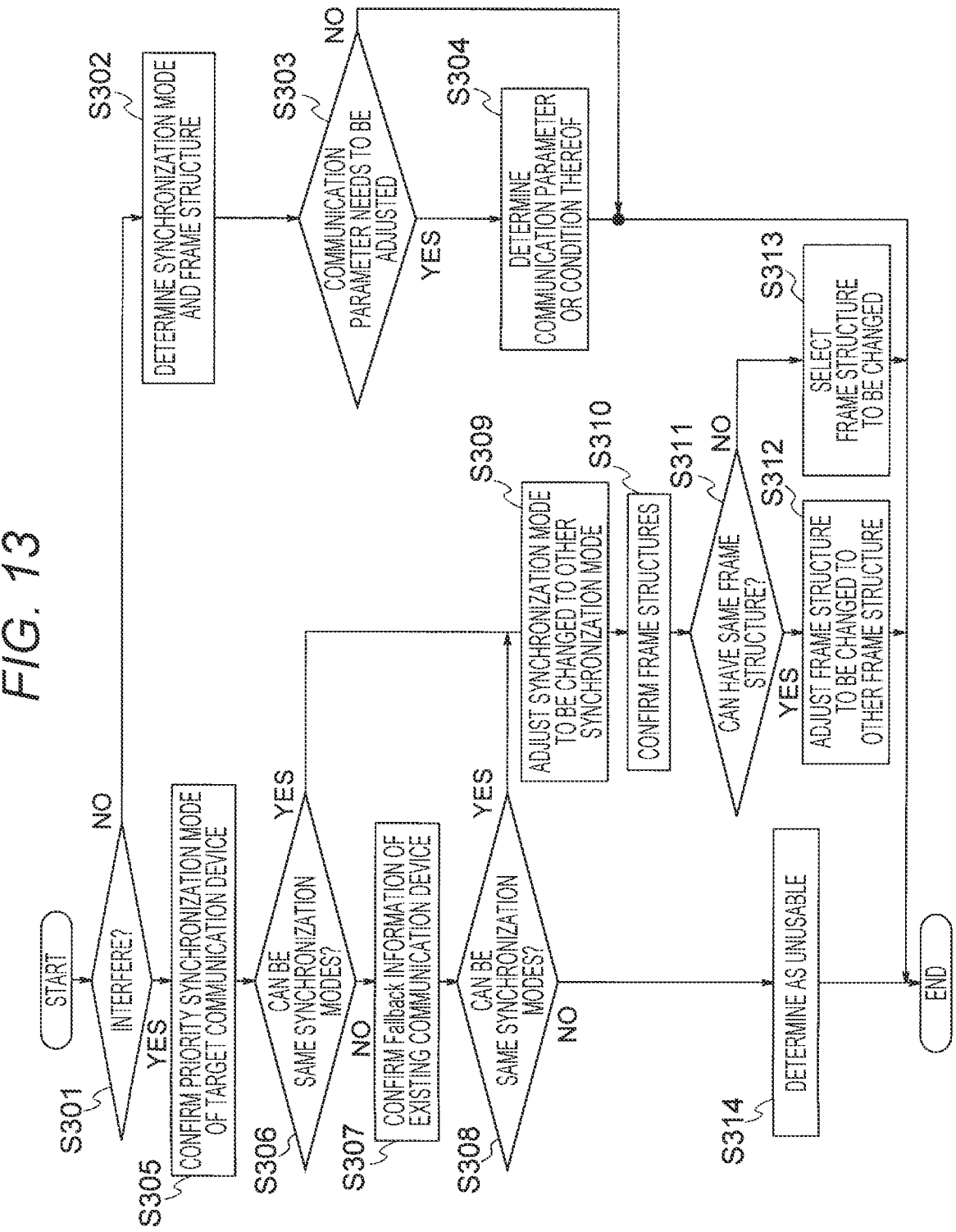
FIG. 13 is a flowchart of decision processing in a case where the spectrum to be used is already allocated.

FIG. 13 is a flowchart of decision processing in a case where a spectrum to be used has already been allocated. In a case where the determination result indicates that the interference does not occur (NO in S301), the decision unit 133 decides the synchronization mode and the TDD frame structure as requested by the target communication device 110 (S302). For example, in a case where there is a plurality of preferred synchronization modes, the decision unit 133 may decide the synchronization mode having the highest rank (priority) as the synchronization mode to be used. In a case where there is no rank, it may be determined as appropriate.

Furthermore, as described above, even if the determination result is that the interference does not occur, the communication parameter may need to be adjusted. In a case where the communication parameter needs to be adjusted (YES in S303), the decision unit 133 decides the communication parameter or the condition of the communication parameter in order to avoid the interference (S304), and the flow ends. For example, the communication parameter calculated when the determination unit 132 determines that the interference is avoidable may be instructed to the target communication device 110. Alternatively, an upper limit value, a lower limit value, or an allowable range of the communication parameter may be decided as the condition of the communication parameter. For example, a condition that the maximum allowable transmission power is set to the upper limit value of the transmission power may be decided as the condition of the communication parameter. Furthermore, for example, an allowable range of the direction of the transmission radio wave (the direction of the beam) may be decided as the condition of the communication parameter. In a case where the communication parameter does not need to be adjusted (YES in S303), the communication parameter is not changed from the preferred one of the target communication device 110, and the flow ends.

In a case where the determination result indicates that the interference occurs (YES in S301), the decision unit 133 confirms whether the synchronization mode of the existing communication device 110 determined to interfere is included in the preferred synchronization mode information of the target communication device 110 (S305).

In a case where the synchronization modes of the target communication device 110 and the existing communication device 110 determined to interfere can be made the same (YES in S306), the synchronization mode to be changed is adjusted to be changed to the other synchronization mode (S309). In a case where the synchronization mode of the existing communication device 110 is included in the preferred synchronization mode information of the target communication device 110, the preferred synchronization mode of the target communication device 110 is adjusted to be changed to the synchronization mode of the existing communication device 110 determined to interfere.

Then, the decision unit 133 confirms the TDD frame structures of the target communication device 110 and the existing communication device 110 (S310). In a case where the preferred synchronization mode of the target communication device 110 is adjusted to be changed to that of the existing communication device 110 determined to interfere, it is confirmed whether the TDD frame structure of the existing communication device 110 determined to interfere is included in the preferred/capable TDD frame structure of the target communication device 110.

In a case where the target communication device 110 and the existing communication device 110 can have the same TDD frame structure (YES in S311), the TDD frame structure to be changed is adjusted to be changed to the other TDD frame structure (S312). In a case where the preferred synchronization mode of the target communication device 110 is adjusted to be changed to that of the existing communication device 110 determined to interfere, when the TDD frame structure of the existing communication device 110 is included in the preferred/capable TDD frame structure of the target communication device 110, the TDD frame structure of the target communication device 110 is made to be the same as the TDD frame structure of the existing communication device 110 determined to interfere (S312).

On the other hand, in a case where the target communication device 110 and the existing communication device 110 cannot have the same TDD frame structure (NO in S311), the second-best TDD frame structure is selected and set to the TDD frame structure to be changed. When the TDD frame structure of the existing communication device 110 is not included in the preferred/capable TDD frame structure of the target communication device 110, the best TDD frame structure is selected among TDD frame structures included in the preferred/capable TDD frame structure. Here, it is assumed that a larger number of unit periods in which the order is the same and the communication direction (UL, DL, F) matches is better. The decision unit 133 confirms whether the communication direction in the i-th (i is an integer equal to or more than one and equal to or less than the total number of slots) unit period of the TDD frame structure to be compared matches with the communication direction in the i-th unit period of the TDD frame structure of the existing communication device 110. In other words, it is confirmed whether the communication direction in the unit period indicated by the TDD frame structure used for the existing communication device 110 matches with the communication direction of the unit period indicated by the frame structure allowed in the target communication device 110 and corresponding to the unit period. Then, the TDD frame structure having the largest number of matched unit periods may be selected as the next best structure of the same TDD frame structure. In this manner, the TDD frame structure may be decided on the basis of the number of matches.

On the other hand, in a case where the synchronization mode of the existing communication device 110 is not included in the preferred synchronization mode information of the target communication device 110 (YES in S306), the target communication device 110 cannot be adjusted to the existing communication device 110, and thus the setting of the existing communication device 110 is changed. Specifically, in this case, the decision unit 133 confirms whether the preferred synchronization mode of the target communication device 110 is included in the fallback information of the existing communication device 110 (S307). In a case where the preferred synchronization mode of the target communication device 110 is included in the fallback information of the existing communication device 110 (YES in S308), the synchronization mode of the existing communication device 110 determined to interfere is adjusted to be changed to the preferred synchronization mode of the target communication device 110 (S309).

Also in processing of S310 to S313, as in S309 described above, the existing communication device 110 is treated as a side to be changed. It is confirmed whether the preferred/capable TDD frame structure of the target communication device 110 is included in the fallback information of the existing communication device 110 (S310). In a case where it is included (YES in S311), the TDD frame structure of the existing communication device 110 is adjusted to be changed to the preferred/capable TDD frame structure of the target communication device 110 (S312). In a case where it is not included (NO in S311), the best TDD frame structure is selected from the TDD frame structures included in the preferred/capable TDD frame structure of the target communication device 110 as the TDD frame structure of the existing communication device 110 (S313). Thus, the flow ends.

On the other hand, in a case where the preferred synchronization mode of the target communication device 110 is not included in the fallback information of the existing communication device 110 (NO in S308), the decision unit 133 decides that the shared frequency band cannot be used in the preferred synchronization mode of the target communication device 110 (S314), and the flow ends.

Note that in a case where it is decided that the shared frequency band cannot be used, the transmission unit 134 desirably transmits a notification for requesting reconsideration of the preferred synchronization mode to the target communication device 110.

Figure 14:
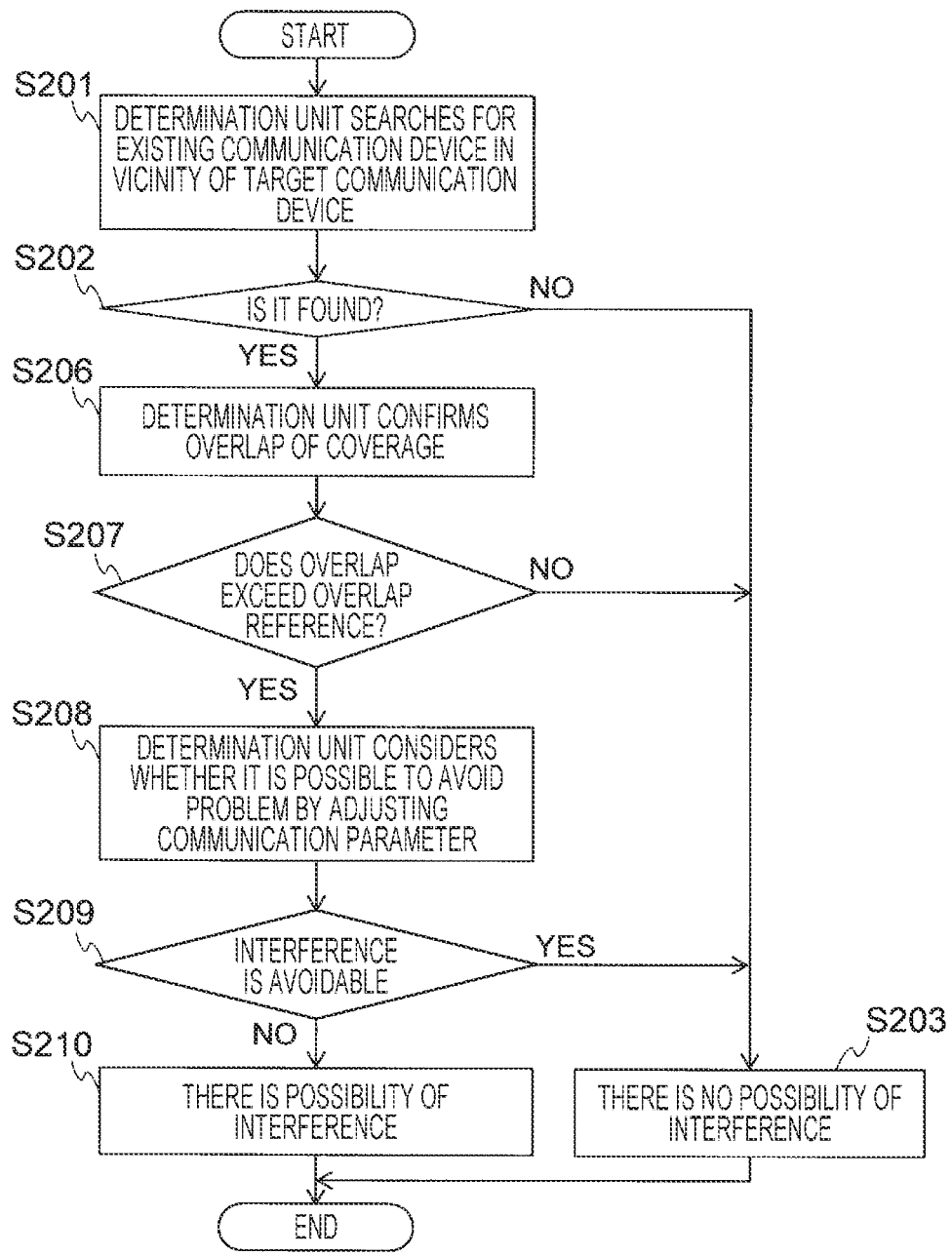
FIG. 14 is a flowchart of determination processing in a case where the spectrum to be used is not yet allocated.

FIG. 14 is a flowchart of determination processing in a case where a spectrum to be used is not yet allocated. Since the spectrum separation cannot be confirmed, this flowchart is different from the flowchart of the determination processing in the case where the spectrum to be used is already allocated, which is illustrated in FIG. 12, in that S204 and S205 are omitted. The other points are the same.

Figure 15:
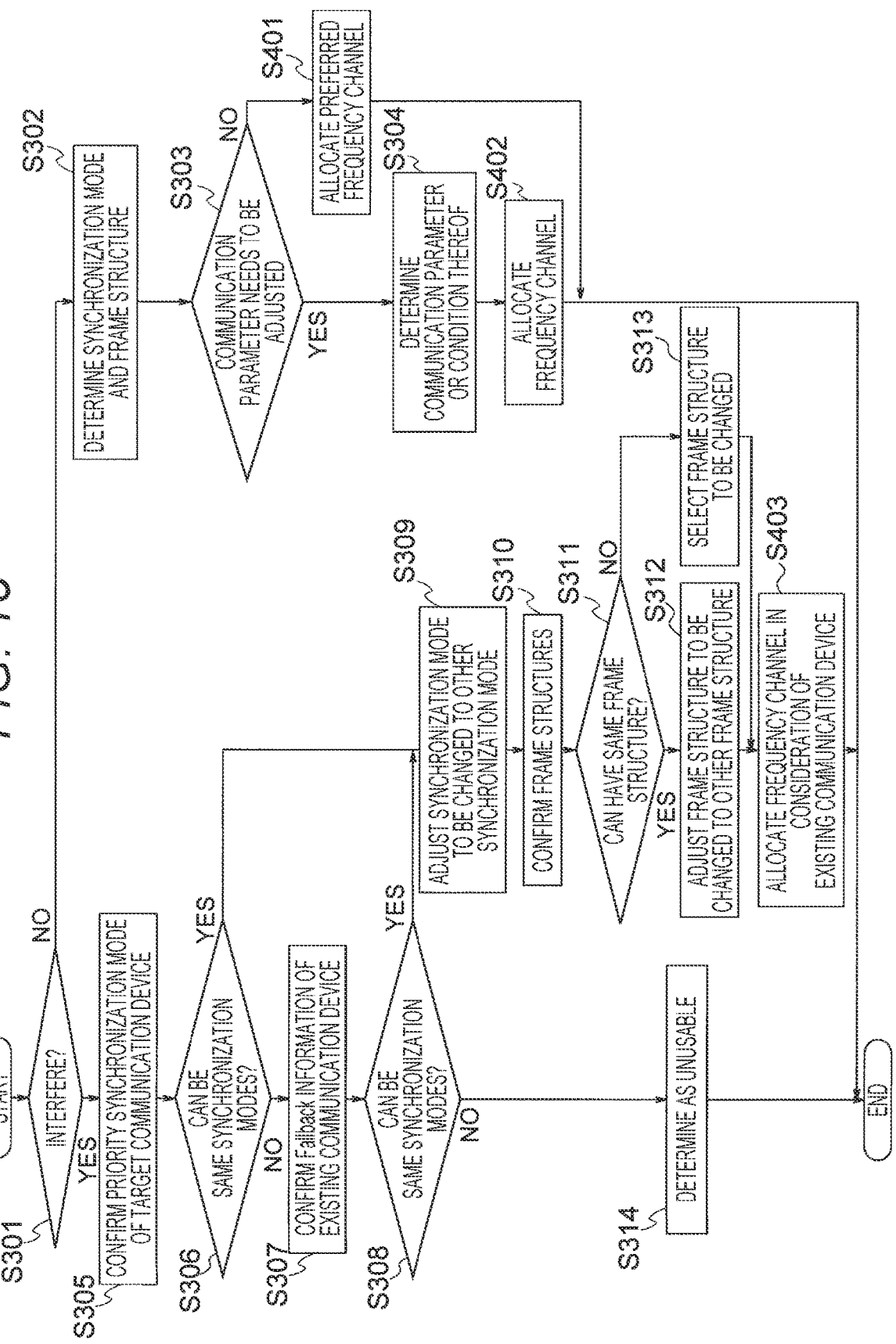
FIG. 15 is a flowchart of decision processing in a case where the spectrum to be used is not yet allocated.

FIG. 15 is a flowchart of decision processing in a case where a spectrum to be used is not yet allocated. Spectrum allocation processing (S401, S402, and S403) is added to the flowchart of the decision processing in a case where the spectrum to be used is already allocated, which is illustrated in FIG. 13. The other points are the same as the flowchart of the decision processing in the case where the spectrum to be used is already allocated, which is illustrated in FIG. 13, and the description thereof will be omitted.

In a case where the target communication device 110 does not interfere with the existing communication device 110

(NO in S301), when the communication parameter does not need to be adjusted (NO in S303), the decision unit 133 allocates a frequency channel preferred by the target communication device 110 (S401). Note that in a case where there is no preferred frequency channel, the frequency channel may be appropriately determined. When the communication parameter needs to be adjusted (YES in S303), the decision unit 133 may allocate the frequency channel in consideration of the spectrum used by the target communication device 110, or may allocate the frequency channel without the consideration (S402). For example, in a case where the target communication device 110 uses a part of the shared frequency band, the decision unit 133 may allocate a remaining part or all of the shared frequency band to the target communication device 110. Assuming that the interference does not occur due to adjustment of the communication parameter, the frequency channel preferred by the target communication device 110 may be allocated to the target communication device 110.

On the other hand, in a case where the target communication device 110 interferes with the existing communication device 110 (YES in S301), when the target communication device 110 and the existing communication device 110 can be set to the same synchronization mode (YES in S306 or YES in S308), the decision unit 133 allocates a frequency channel in consideration of the spectrum used by the target communication device 110 (S403).

Note that there may be no frequency channel (free frequency channel) that can be allocated. In this case, the free frequency channel may be checked, and in a case where there is a free spectrum, this flow may be started. In a case where there is no free frequency channel, it may be decided as unavailable.

Since the frequency channels are limited as described above, it is desirable that a plurality of communication devices 110 uses the same frequency channel as much as possible. For example, in a case where the existing communication device 110 is not found in the vicinity of the target communication device 110, the decision unit 133 desirably allocates the spectrum already allocated to the existing communication device 110 that is not in the vicinity of the target communication device 110 to the target communication device 110. Thus, the communication control device 130 is only required to store the allocated spectrum in the storage unit 135 and refer to it in such a case.

Figure 16:
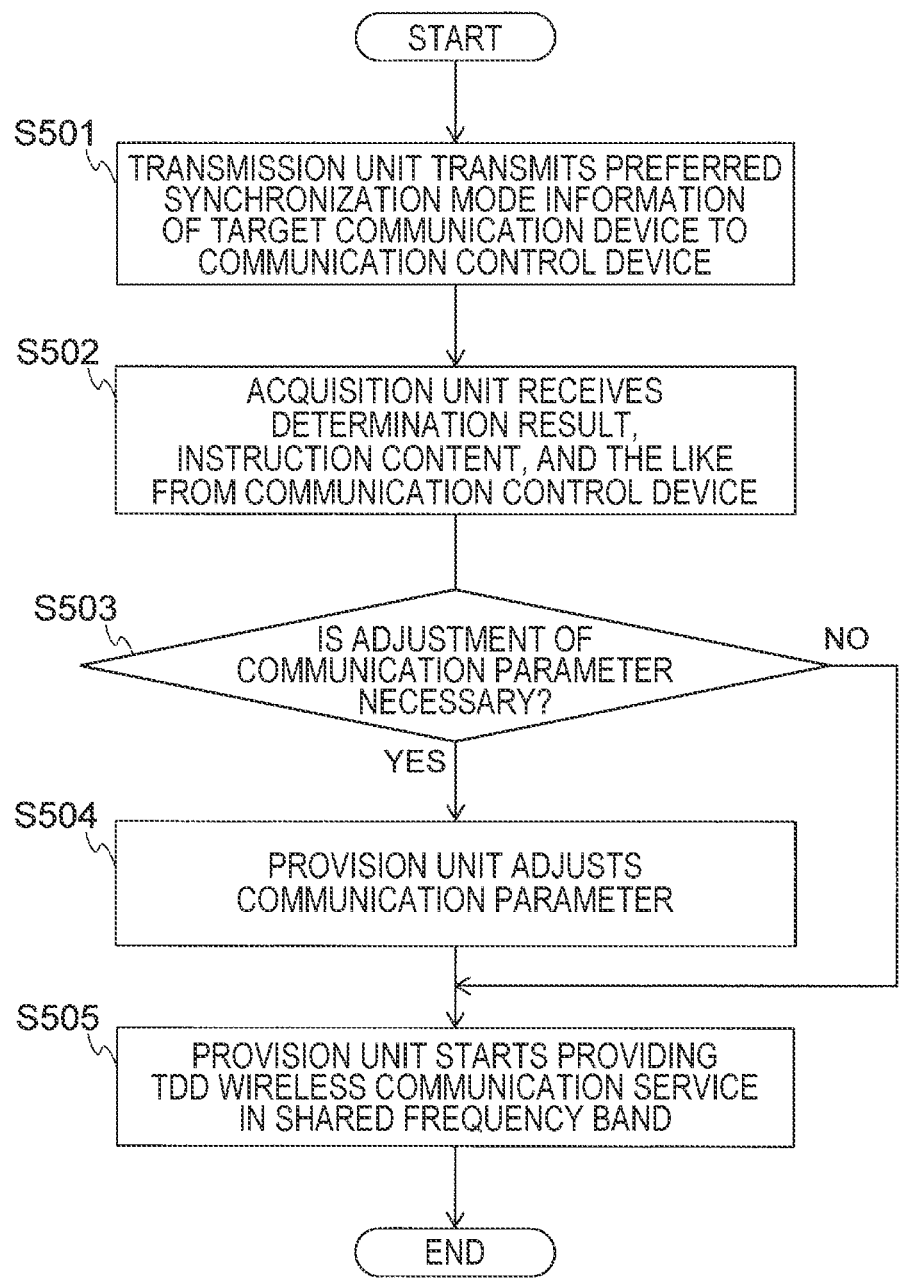
FIG. 16 is a schematic flowchart of a procedure for time synchronization of the communication device.

FIG. 16 is a schematic flowchart of a procedure for time synchronization of the communication device 110. The transmission unit 111 transmits the preferred synchronization mode information and the like to the communication control device 130 (S501). Note that, as described above, the preferred synchronization mode information may include the preferred synchronization mode or information from which the preferred synchronization mode can be estimated. Furthermore, the processing of the communication control device 130 that has received the preferred synchronization mode information is as described above. Then, the acquisition unit 112 receives the determination result, instruction content, and the like from the communication control device 130 (S502).

In a case where the communication parameter for providing the TDD wireless communication service in the shared frequency band needs to be adjusted by an instruction of the communication control device 130 (YES in S503), the provision unit 113 adjusts the communication parameter (S504). For example, the value of the transmission power is decided to be equal to or less than a specified upper limit value. For example, the direction of the transmission radio wave is decided within a specified allowable range. In a case where the communication parameter does not need to be adjusted (NO in S503), the adjustment of the communication parameter is omitted.

Then, the provision unit 113 starts providing the TDD wireless communication service in the shared frequency band (S505), and notifies the terminal 120 that uses the wireless communication service. As illustrated in FIG. 9, at this time, the terminal 120 is notified of the communication parameter to be set by the terminal 120 in order to use the wireless communication service. Then, as illustrated in FIG. 9, the terminal 120 performs the setting, and wireless communication between the terminals 120 becomes possible.

Note that the flowcharts of the present disclosure are examples, and it is not always necessary to follow the flows. For example, S402 (allocation of the frequency channel) in FIG. 15 is performed after S304 (determination of communication parameters), but the order may be changed or they may be performed in parallel. Furthermore, a processing result of each processing may be sequentially stored in the storage unit 135 or the storage unit 114, and each component may acquire the processing result via the storage unit 135 or the storage unit 114.

As described above, the communication control device 130 decides the synchronization mode and the TDD frame structure of the target communication device 110 in consideration of the synchronization mode and the TDD frame structure of the existing communication device 110. Thus, even in a case where there is an existing communication device 110 that interferes, the target communication device 110 and the existing communication device 110 can coexist by appropriately selecting the synchronization mode and the TDD frame structure of the target communication device 110. Furthermore, even in a case where it is considered that the target communication device 110 cannot coexist in the current situation, it becomes possible for the target communication device 110 to coexist by changing the setting of the existing communication device 110 using the fallback information of the existing communication device 110.

Note that the above-described embodiments illustrate examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are similarly included in the invention described in the claims and the equivalent scopes thereof.

Furthermore, the procedures of processing described in the present disclosure, such as the above-described flowcharts, may be regarded as a method having a series of these procedures. Alternatively, the procedures may be regarded as a program for causing a computer to execute the series of these procedures or a recording medium storing the program. The type of the recording medium does not affect the embodiment of the present disclosure, and thus is not particularly limited.

Note that in the present disclosure, the expression "and/or" means that it may be read as "and" and may be read as "or".

Note that the present disclosure can also employ the following configurations.

[1] A communication control device including:
  an acquisition unit that acquires a synchronization mode of a time division duplex allowed by a first wireless system;
  a determination unit that determines whether or not interference occurs in a case where the first wireless system and a second wireless system perform wireless communication by the time division duplex in a shared frequency band; and
  a decision unit that decides a synchronization mode to be used in the first wireless system on the basis of a result of the determination and a synchronization mode allowed by the first wireless system.

[2] The communication control device according to [1] above, in which
  the decision unit decides a frame structure of the time division duplex to be used in the first wireless system on the basis of the synchronization mode decided.

[3] The communication control device according to [1] or [2] above, in which
  in a case where it is determined that the interference occurs, the decision unit sets the synchronization mode to be used in the first wireless system to be same as a synchronization mode to be used in the second wireless system.

[4] The communication control device according to [3] above, in which
  in a case where the synchronization mode to be used in the first wireless system is same as the synchronization mode to be used in the second wireless system, the decision unit sets a frame structure to be used in the first wireless system to be same as a frame structure to be used in the second wireless system.

[5] The communication control device according to [4] above, in which
  the acquisition unit acquires a frame structure allowed by the first wireless system, and
  in a case where the synchronization mode to be used in the first wireless system is the same as the synchronization mode to be used in the second wireless system, when the frame structure to be used in the second wireless system is not included in the frame structure allowed by the first wireless system, the decision unit decides the frame structure to be used in the first wireless system from among frame structures allowed by the first wireless system.

[6] The communication control device according to [5] above, in which
  the decision unit
  confirms whether a communication direction in a unit period indicated by the frame structure to be used in the second wireless system matches with a communication direction in a unit period indicated by the frame structure allowed by the first wireless system and corresponding to the unit period, and
  decides the frame structure to be used in the first wireless system from among frame structures allowed by the first wireless system on the basis of a matched number.

[7] The communication control device according to any one of [3] to [6] above, in which
  the acquisition unit acquires a synchronization mode allowed by the second wireless system, and
  in a case where the synchronization mode to be used in the second wireless system is not included in the synchronization mode allowed by the first wireless system, when the synchronization mode allowed by the first wireless system is included in the synchronization mode allowed by the second wireless system, the decision unit decides the synchronization mode to be used in the second wireless system from synchronization modes allowed by the second wireless system.

[8] The communication control device according to any one of [1] to [7] above, in which
  in a case where it is determined that the interference does not occur, the decision unit decides a synchronization mode having a highest priority among synchronization modes allowed by the first wireless system as the synchronization mode to be used in the first wireless system.

[9] The communication control device according to any one of [1] to [8] above, in which
  the acquisition unit acquires a frame structure allowed by the first wireless system, and
  in a case where it is determined that the interference does not occur, the decision unit decides a frame structure having a highest priority among frame structures allowed by the first wireless system as a frame structure to be used in the first wireless system.

[10] The communication control device according to any one of [1] to [9] above, in which
  in a case where it is determined that the interference does not occur, the decision unit decides a frame structure having a highest priority among frame structures allowed by the first wireless system as a frame structure to be used in the first wireless system.

[11] The communication control device according to any one of [1] to [10] above, in which
  the determination unit sets, as the second wireless system, a wireless communication system in which a distance from the first wireless system is within a predetermined value and wireless communication by the time division duplex is performed in the shared frequency band.

[12] The communication control device according to any one of [1] to [11] above, in which
  the determination unit performs the determination at least on the basis of a separation between a spectrum allocated to the first wireless system and a spectrum allocated to the second wireless system.

[13] The communication control device according to any one of [1] to [12] above, in which
  the determination unit makes the determination at least on the basis of an overlap between a communication region provided by the first wireless system and a communication region provided by the second wireless system.

[14] The communication control device according to any one of [1] to [13] above, in which
  the determination unit performs the determination by changing a value of a parameter used by the first wireless system to perform wireless communication by the time division duplex in the shared frequency band.

[15] The communication control device according to any one of [1] to [14] above, further including
  a transmission unit that transmits the synchronization mode to be used in the first wireless system to the first wireless system.

[16] A communication device including:
  a transmission unit that transmits a synchronization mode of a time division duplex to a communication control device;
  an acquisition unit that receives a synchronization mode or a frame structure of the time division duplex decided by the communication control device; and a provision unit that provides a wireless communication service of the time division duplex in a shared frequency band to a predetermined terminal on the basis of a received frame structure, in which the synchronization mode or the frame structure decided by the communication control device is decided on the basis of a transmitted synchronization mode, a synchronization mode of another communication device using the shared frequency band, and a frame structure to be used or allowed by the another communication device.

[17] The communication device according to [16] above, in which the acquisition unit receives a condition when providing the wireless communication service from the communication control device, and the provision unit changes a communication parameter when providing the wireless communication service to satisfy the condition.

[18] A communication control method including:

a step of acquiring a synchronization mode of a time division duplex allowed by a first wireless system;

a step of determining whether or not interference occurs in a case where the first wireless system and a second wireless system perform wireless communication by the time division duplex in a shared frequency band; and a step of deciding a synchronization mode to be used in the first wireless system on the basis of a result of the determination and a synchronization mode allowed by the first wireless system.

REFERENCE SIGNS LIST

100 Communication network
110 (110A, 110B, 110C) Communication device
111 Transmission unit of communication device
112 Acquisition unit of communication device
113 Provision unit
114 Storage unit of communication device
120 Terminal
130 (130A, 130B) Communication control device
131 Acquisition unit of communication control device
132 Determination unit
133 Decision unit
134 Transmission unit of communication control device
135 Storage unit of communication control device

The invention claimed is:

1. A communication control device, comprising:
circuitry configured to:
receive, from a communication device, information including a first time division duplex (TDD) configuration related to a first wireless system, wherein the information includes fallback information;
determine whether interference occurs, wherein
the interference is between the first wireless system and a second wireless system, and
the second wireless system performs wireless communication in a shared frequency band;
select a second TDD configuration to be used in the first wireless system, wherein the selection is based on the determination that the interference occurs, the first TDD configuration, and the fallback information; and
transmit, to the communication device, information related to the selected second TDD configuration.

2. The communication control device according to claim 1, wherein
the circuitry is further configured to select a first frame structure of the TDD configuration based on the selected second TDD configuration to be used in the first wireless system.

3. The communication control device according to claim 1, wherein
the circuitry is further configured to set, based on the determination that the interference occurs, the second TDD configuration to be used in the first wireless system to be same as a third TDD configuration to be used in the second wireless system.

4. The communication control device according to claim 3, wherein
the circuitry is further configured to set, based on the second TDD configuration to be used in the first wireless system is same as the third TDD configuration to be used in the second wireless system, a first frame structure to be used in the first wireless system to be same as a second frame structure to be used in the second wireless system.

5. The communication control device according to claim 4, wherein the circuitry is further configured to:
acquire a first frame structure related to the first wireless system; and
select, based on the second TDD configuration to be used in the first wireless system is the same as the third TDD configuration to be used in the second wireless system and the second frame structure to be used in the second wireless system is not the same as the first frame structure related to the first wireless system, a third frame structure to be used in the first wireless system from among frame structures related to the first wireless system.

6. The communication control device according to claim 5, wherein the circuitry is further configured to:
confirm whether a first communication direction in a unit period indicated by the second frame structure to be used in the second wireless system matches with a second communication direction in a unit period indicated by the first frame structure related to the first wireless system; and
select the second frame structure to be used in the first wireless system from among the frame structures related to the first wireless system based on the first communication direction that matched with the second communication direction.

7. The communication control device according to claim 3, wherein the circuitry is further configured to:
acquire information of a fourth TDD configuration related to the second wireless system; and
select, based on the third TDD configuration to be used in the second wireless system is not same as the second TDD configuration related to the first wireless system and the second TDD configuration related to the first wireless system is the fourth TDD configuration related to the second wireless system, the third TDD configuration to be used in the second wireless system from TDD configurations related to the second wireless system.

8. The communication control device according to claim 1, wherein the circuitry is further configured to:
select, based on the determination that the interference does not occur, the TDD configuration having a highest priority among a plurality of TDD configurations related to the first wireless system as the second TDD configuration to be used in the first wireless system.

9. The communication control device according to claim 1, wherein the circuitry is further configured to:
acquire a first frame structure related to the first wireless system.

10. The communication control device according to claim 9, wherein the circuitry is further configured to:
select, based on the determination that the interference does not occur, a frame structure having a highest priority among frame structures related to the first wireless system as a frame structure to be used in the first wireless system.

11. The communication control device according to claim 1, wherein
a distance between the first wireless system and the second wireless system is within a specific value.

12. The communication control device according to claim 1, wherein
the determination is based on a separation between a spectrum allocated to the first wireless system and a spectrum allocated to the second wireless system.

13. The communication control device according to claim 1, wherein
the determination is based on an overlap between a communication region of the first wireless system and a communication region of the second wireless system.

14. The communication control device according to claim 1, wherein the circuitry is further configured to:
determine that the interference occurs based on a value of a communication parameter used by the second wireless system;
determine whether a change in the value of the communication parameter avoids the interference; and
cause the change in the value of the communication parameter used by the second wireless system.

15. The communication control device according to claim 1, wherein the circuitry is further configured to receive information including a fifth TDD configuration related to the second wireless system.

16. The communication control device according to claim 15, wherein the circuitry is further configured to select the second TDD configuration to be used in the first wireless system based on the fifth TDD configuration related to the second wireless system.

17. The communication control device according to claim 1, wherein the first wireless system performs wireless communication in the shared frequency band.

18. A communication device, comprising:
circuitry configured to:
transmit, to a communication control device, information including a first time division duplex (TDD) configuration related to a first wireless system, wherein the information includes fallback information;
receive information related to a second TDD configuration selected by the communication control device; and
provide a wireless communication service of the second TDD configuration in a shared frequency band to a specific terminal based on the received information related to the second TDD configuration, wherein
the second TDD configuration selected by the communication control device is selected based on the transmitted information including the first TDD configuration and the fallback information.

19. The communication device according to claim 18, wherein the circuitry is further configured to:
receive a condition associated with the wireless communication service from the communication control device, and
change a communication parameter associated with the wireless communication service to satisfy the condition.

20. A communication control method, comprising:
receiving, from a communication device, information including a first time division duplex (TDD) configuration related to a first wireless system, wherein the information includes fallback information;
determining whether interference occurs, wherein
the interference is between the first wireless system and a second wireless system, and
the second wireless system performs wireless communication in a shared frequency band;
selecting a second TDD configuration to be used in the first wireless system, wherein the selection is based on the determination that the interference occurs, the first TDD configuration, and the fallback information; and
transmitting, to the communication device, information related to the selected second TDD configuration.

* * * * *